United States Patent

Sato et al.

[11] Patent Number: 5,563,715
[45] Date of Patent: Oct. 8, 1996

[54] APPARATUS FOR REPRODUCING RECORDED PICTURE IMAGE SIGNALS

[75] Inventors: Koichi Sato; Harumi Aoki, both of Tokyo, Japan

[73] Assignee: Asahi Kogaku Kogyo Kabushiki Kaisha, Tokyo, Japan

[21] Appl. No.: 591,107

[22] Filed: Jan. 25, 1996

Related U.S. Application Data

[63] Continuation of Ser. No. 376,647, Jan. 20, 1995, abandoned, which is a continuation of Ser. No. 169,488, Dec. 20, 1993, abandoned.

[30] Foreign Application Priority Data

Dec. 21, 1992 [JP] Japan ................................ 4-356287
Dec. 21, 1992 [JP] Japan ................................ 4-356288

[51] Int. Cl.$^6$ ................................ H04N 5/76; G11B 5/00
[52] U.S. Cl. ................................ 386/46; 360/32; 386/121
[58] Field of Search ................................ 358/310, 342, 358/328, 335, 906, 311; 360/9.1, 22, 32, 27, 33.1, 10.1, 13, 14.1, 15

[56] References Cited

U.S. PATENT DOCUMENTS

| | | | |
|---|---|---|---|
| 4,730,222 | 3/1988 | Schauffele | 358/310 |
| 4,843,485 | 6/1989 | Reitmeier | 360/9.1 |
| 4,963,991 | 10/1990 | Honjo | 358/310 |
| 5,097,363 | 3/1992 | Takei et al. | 360/10.3 |
| 5,200,862 | 4/1993 | Sato | 360/10.1 |

FOREIGN PATENT DOCUMENTS 64-37193  2/1989  Japan .
2-50358   2/1990  Japan .

*Primary Examiner*—Thai Q. Tran
*Assistant Examiner*—Robert Chevalier
*Attorney, Agent, or Firm*—Greenblum & Bernstein P.L.C.

[57] ABSTRACT

A still video apparatus for recording picture image signals on a recording medium, including a recording mechanism having a plurality of record processing systems for recording the picture image signals on the recording medium, and a recording mode switching mechanism for selecting one of the record processing systems, wherein the record processing system that is used depends on the type of inputted picture image signals.

21 Claims, 15 Drawing Sheets

APPARATUS FOR REPRODUCING RECORDED PICTURE IMAGE SIGNALS

This application is a continuation application Ser. No. 08/376,647, filed Jan. 20, 1995, now abandoned, which is a continuation of Application Ser. No. 08/169,488, filed Dec. 20, 1993, now abandoned.

BACKGROUND OF THE INVENTION

1. Field of the Invention

The present invention relates to a still video apparatus for recording and reproducing picture image signals.

2. Description of Related Art

Various apparatuses which record and/or reproduce picture images, sound signals or other information have been developed and marketed. These recording/reproducing apparatuses, particularly still video cameras or electronic still cameras, convert an object image to electrical signals. These signals are recorded on a magnetic disc together with other information. The recorded picture images can be reproduced as necessary to yield still picture images.

In the above-noted type of still video camera, an object image is photoelectrically converted by a solid-state image pickup device to produce luminance signals and color difference signals. The luminance signals and color difference signals are FM-modulated at different frequency bands to obtain multiplexing image signals. The multiplexing image signals are recorded on a predetermined track of a magnetic disc. Recording and photographing information, such as field and frame data, track numbers, and ID data signals of photographing dates, etc. are DPSK-modulated (i.e., modulated by Differential Phase Shift Keying) and are superimposed on the image signals in a frequency multiplexing system.

Upon reproducing the image signals recorded on the magnetic disk, the FM-demodulated luminance signals and color difference signals are converted to digital data in accordance with sampling pulses which are generated based on the vertical and horizontal synchronizing signals that have been separated from from the luminance signals. The digital data is stored in a memory. The digital data stored in the memory is read in accordance with a predetermined reference clock signal and is converted to an analog signal. Thereafter, the analog signal is output to a video output terminal through an outputting circuit.

In the known still video apparatus, e.g., still video camera, in order to record picture signals of various television systems onto the magnetic disc, it is necessary that the processing system of the recording device correspond to the processing system of the television system. In addition, in order to reproduce the picture signals from the magnetic disc, reproduction must be carried out in accordance with the processing system of the recording device.

For instance, in the case where the input picture image signal is a standard TV signal (i.e., standard picture image signal), such as an NTSC signal, the luminance signal and the line-sequential color difference signal are superimposed and recorded on the same track without dividing the picture plane or extending the time base. Upon reproduction of the recorded data, a reproduction process which corresponds to the recording process is performed.

If the input image signal is an HDTV signal (i.e., High Definition Picture Image signal), the above-mentioned recording system cannot be used because there is lack of recording frequency band. Accordingly, for example, the picture signals corresponding to one picture plane are time-base extended so as to record the picture signals on a plurality of tracks. Upon reproduction of the recorded picture signals, the reproduction process corresponding to the recording process is executed. Thus, the frequency band (i.e., zone) of the picture signals which can be recorded is substantially expanded. Accordingly, a high definition picture image recording can be effected.

In the case of a system for office or business use, a camera and a monitor are selected in accordance with the system of the picture image signals to be recorded and are connected to the still video apparatus. It is sometimes necessary to reproduce the picture image signals at the site of recording, immediately after the picture image signals for several picture planes (i.e., picture images) are recorded, to thereby confirm the recorded picture images. Moreover, it is sometimes necessary to reproduce previously recorded picture image signals in accordance with the same recording system as the recorded picture image signals.

However, the picture signals recorded on the magnetic disc might include those recorded in a recording system different from the picture image signals to be reproduced. In such case, it is possible that picture image signals recorded by a different recording system will be reproduced by mistake. Accordingly, the monitor will not generate the desired picture image.

No still video apparatus hitherto known has been provided which includes both of the above-mentioned types of recording and reproducing systems. Consequently, it has been necessary to use a recording apparatus which records the standard picture image signals and a recording apparatus which records the high definition picture images. However, the use of two separate recording apparatuses is troublesome.

SUMMARY OF THE INVENTION

The primary object of the present invention is to provide a still video apparatus which can prevent picture images that do not correspond to the recording system from being reproduced.

To achieve the object mentioned above, according to the present invention, a still video apparatus for recording picture image signals on a recording medium is provided, including a recording mechanism having a plurality of record processing systems for recording the picture image signals on the recording medium, and a recording mode switching mechanism for selecting one of the record processing systems, wherein the record processing system that is used depends on the type of inputted picture image signals. In this arrangement it is preferable that a recording mode switching mechanism is provided that includes a standard recording mode in which standard picture image signals are recorded and a high definition recording mode in which high definition picture image signals are recorded.

According to another aspect of the present invention, a still video apparatus which reproduces different types of picture image signals that were recorded on a recording medium in different recording modes is provided, including a reproducing mechanism having reproducing modes corresponding to the recording modes, and a reproducing mode switching mechanism for switching the reproducing mode in accordance with the recording mode of the picture image signals to be reproduced from the recording medium. In this arrangement, it is preferable that the reproducing mode switching mechanism includes a standard reproducing mode at which standard picture image signals are reproduced, and a high definition reproducing mode at which high definition picture image signals are reproduced.

According to yet another aspect of the present invention, a still video apparatus including a recording mechanism for recording picture image signals corresponding to one picture plane onto a recording medium, and a reproducing mechanism for reproducing the picture image signals recorded on the recording medium are provided, including a recording mode switching mechanism for recording the picture image signals on the recording medium with a recording system corresponding to the type of picture image signals inputted to the recording mechanism, and, a reproducing mode switching mechanism for selecting the most recent recording system of the picture image signals recorded by the recording mechanism.

The present disclosure relates to subject matter contained in Japanese Patent Application Nos. HEI4-356287 and HEI4-356288 (both filed on Dec. 21, 1992) which are expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

A still video apparatus to which the illustrated embodiments are directed includes a recording mechanism and a reproducing mechanism. Nevertheless, the application of the present invention is not limited thereto. The present invention can be applied to an arrangement in which a recording system and a separate reproducing system are connected by a wire or by a radio communication device (i.e., wireless connection) to control or transmit and receive picture image data, etc.

Figure 1:
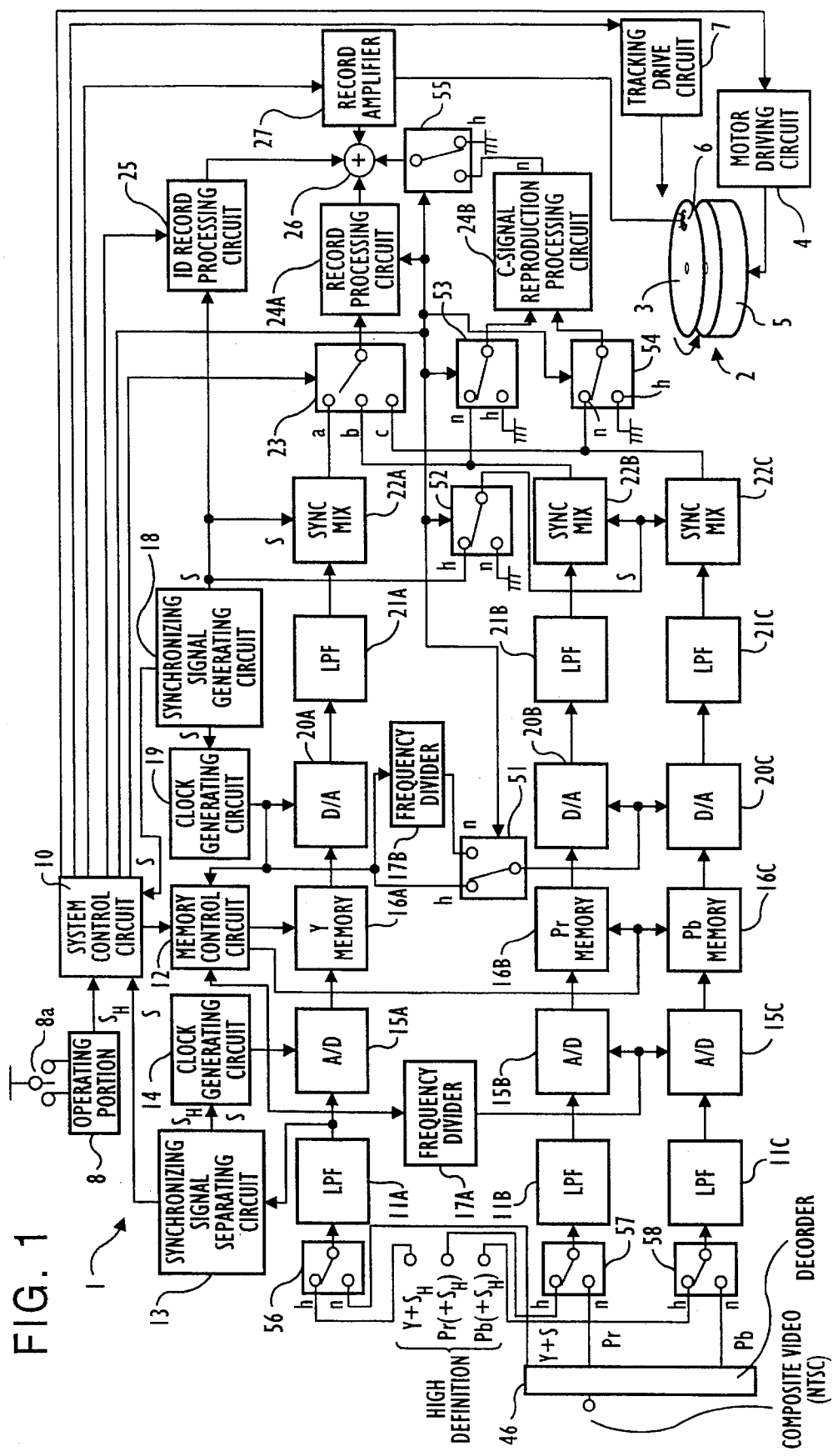
FIG. 1 is a block diagram of a recording system of a still video apparatus according to the present invention.

In FIG. 1, which shows a block diagram of a recording system, a still video apparatus 1 includes a system control circuit 10 which controls various functions of the still video apparatus, which will be discussed hereinafter. The system control circuit 10 is usually comprised of a micro computer.

A magnetic disc driver 2 is provided in the still video apparatus 1. The magnetic disc driver 2 has a spindle motor 5 which can rotate at a constant high speed. The rotation of the spindle motor 5 is controlled by a motor driving circuit 4, which drives the spindle motor 5 to which electrical power is supplied, and the system control circuit 10, which controls the motor driving circuit 4.

A magnetic disc 3 which is housed, for example, in a jacket, is loaded in the magnetic disc driver 2. Photographed picture images, sound signals, and other data related to the picture images are recorded on the magnetic disc 3. The magnetic disc 3, which is usually made of a flat circular material whose surface is coated with a magnetic layer, is provided with a plurality of concentric tracks (normally 52 tracks) arranged in a predetermined format. The center of the magnetic disc 3 is fitted on a spindle of the spindle motor 5. Upon recording or reproducing data onto or from the magnetic disc 3, the magnetic disc 3 is rotated at a constant speed (i.e., 3600 rpm in the case of an NTSC system or HDTV system, and 3000 rpm in the case of PAL system) by the spindle motor 5.

A predetermined number of FG pulses corresponding to the rotational speed of the spindle motor 5 are output therefrom. One PG pulse is output from the vicinity of the center of the magnetic disc 3, which is connected to the spindle of the spindle motor 5, every time one turn of the magnetic disc takes place. The system control circuit 10 controls the rotation of the spindle motor 5 in accordance with the outputted pulse signal to rotate the magnetic disc 3 at a constant speed upon recording or reproducing the magnetic disc.

The magnetic disc driver 2 includes a magnetic head 6 which is continuously or discontinuously (i.e., intermittently) moved in a radial direction of the magnetic disc 3, by a stepping motor (not shown). Namely, upon recording or reproduction, the stepping motor is driven to move the magnetic head 6 onto a predetermined track of the magnetic disc 3. Upon reproduction, the magnetic head 6 is correctly disposed on a desired track. Thereafter a fine adjustment of the position of the magnetic head 6 is effected so as to obtain a maximum output (i.e., automatic tracking operation).

The displacement, the speed and the timing of the movement of the magnetic head 6 are controlled by a tracking drive circuit 7 which is in turn controlled by the system control circuit 10.

An operating portion 8 is connected to the system control circuit 10. The operating portion 8 includes a recording system selecting switch (i.e., selection switch) 8*a* which is actuated to select a standard recording mode, in which the standard picture images are recorded, or a high definition recording mode in which high definition picture images are recorded. The operating portion 8 further includes another selection switch which is actuated to select a field recording mode or a frame recording mode, a head feeding switch which is actuated to move the magnetic head 6 onto a predetermined track of the magnetic disc 3, a record switch which is actuated to record picture image signals on the magnetic disc 3, an erasing switch which is actuated to erase the picture image signals recorded on the magnetic disc 3, and a switch which selects the recording or reproducing, etc. (these elements are not shown in the drawings).

An indicator (not shown) is connected to the system control circuit 10. For example, the field recording/frame recording mode, standard image recording/high definition image recording, standard image reproducing/high definition image reproducing, track number, absence or presence of the recorded data on the track, data such as photographing dates (year, month, day), loading or unloading of the magnetic disc 3, power source data, strobe emission data, the current time, etc., are selectively indicated by a liquid crystal display or light emitting elements, etc., in the indicator.

In the case of a still video camera, the still video apparatus includes a picture taking portion (not shown) which is usually comprised of a photographing lens system, a diaphragm, mirrors, an optical filter, a shutter, and a solid-state image sensor (CCD type). These elements are not shown in the drawings. When the shutter is opened, a bundle of rays of an object to be photographed is converged onto the solid-state image sensor through the lens system.

Note that the solid state image sensor can be a solid-state image sensor for a monochrome picture image or a color picture image, a MOS type image sensor or a CCD type image sensor, etc. In the illustrated embodiments, a CCD image sensor (referred to as CCD) for color images is used.

The CCD photoelectrically converts converged picture images and outputs color signals (R, G, B). The color signals are amplified by an amplifier (not shown) and are separated into a luminance signal (Y) and two color difference signals (R-Y, B-Y) by a process/matrix circuit (not shown).

Horizontal and vertical synchronizing signals (S) corresponding to the standard picture image signals or horizontal and vertical synchronizing signals (SH) corresponding to the high definition picture image signals are added to the luminance signal by a synchronizing signal generating circuit (not shown) to output a luminance signal (Y+S) or luminance signal (Y+SH).

In the case of a high definition signal, horizontal and vertical synchronizing signals (SH) are added to the two color difference signals (R-Y, B-Y). Note that if the still video apparatus has no picture taking portion, the above mentioned signals are input to the picture signal input input terminal.

In the still video apparatus 1 according to the present invention, the recording system is switched between the standard recording system (i.e., standard recording mode) for recording the standard picture signals (i.e., standard TV signals) and the high definition recording system (i.e., high definition recording mode) by the recording system selection switch 8 *a* of the operating portion 8 mentioned above. The following discussion will be directed to the recording systems with reference to the recording mode switching mechanism.

[High Definition Recording Mode]

When the high definition recording mode is manually selected by the selection switch 8*a*, terminals h of selection switches 51, 52, 53, 54, 55, 56, 57, and 58, that constitute a part of the recording mode switching mechanism, are connected. Terminal n of the selection switch 52 is grounded. Terminals h of the selection switches 53, 54, and 55 are also grounded. The selection switches 51 through 58 are controlled by the system control circuit 10.

As can be seen in FIG. 1, for example, if the high definition signal is input as the HDTV signal, the high frequency band of the luminance signal (Y+SH) that could be noise (i.e., reflected noise due to sampling) is cut by a low band pass filter 11A. The horizontal and vertical synchronizing signals for the HDTV system (SH) are separated from the luminance signal (Y+SH) by the synchronizing signal separating circuit 13 and input to the clock generating circuit 14, where clock signals serving as reference signals for writing data in each memory are generated. Consequently, memory control circuit 12 and A/D converter 15A operate in response to the clock signals.

The luminance signal Y from which the horizontal and vertical synchronizing signals (SH) that have been separated is converted to a digital signal by the A/D converter 15A and is successively written in the Y-memory 16A.

The color difference signal (R-Y), which will be hereinafter referred to as a color difference signal (Pr), passes through the low band pass filter 11B and is then converted to a digital signal by the A/D converter 15B. Thereafter, the digital signals are successively written in the Pb-memory 16*c*.

Since terminals H of the selection switches 56 through 58 are connected, as mentioned above, even if the standard image signals are inputted, they are not stored in the memories 16A through 16C. Thus, the standard picture signals are prevented from being recorded on the magnetic disc 3 in the high definition recording mode by mistake.

The memory control circuit 12 performs the following control in accordance with the clock signals output from the clock generating circuit 14 at predetermined times for the memories 16A through 16C. The A/D converter 15A operates in response to the clock signal from the clock generating circuit 14. The memory control circuit 12 actuates the writing address counter incorporated therein to write digital data of the luminance ,signal (Y) at a predetermined address of the Y-memory 16A.

The clock signal output from the clock generating circuit 14 is divided in half by a frequency divider 17A to actuate the A/D converters 15B and 15C. The memory control circuit 12 actuates the built-in writing address counter to write digital data of the color difference signals (Pr) and (Pb) at predetermined addresses of the Pr-memory 16B and Pb-memory 16C, respectively. Namely, the color difference signals (Pr, Pb) are written at a speed one half that of the luminance signal (Y).

Note that the synchronizing signal (SH) included in the input signal such as the luminance signals is not extracted, and accordingly, not written in the memory.

The horizontal and vertical synchronizing signals for the standard TV system (S) of, for example, the NTSC system, are output from the synchronizing signal generating circuit 18 and input to the clock generating circuit 19 which generates reading clock signals which define reference signals for starting the reading of the data from the memories.

The reading clock signals are input to the memory control circuit 12, the D/A converters 20A, 20B and 20C, respectively. The memory control circuit 12 performs the following control in accordance with the reading clock signals output from the clock generating circuit 19 at predetermined reading times for the memories 16A through 16C.

Namely, the memory control circuit 12 actuates the reading address counter incorporated therein in accordance with the reading clock signals from the clock generating circuit 19 to read digital data of the luminance signal(Y) at a predetermined address of the memory 16A. Simultaneously, D/A converter 20A operates to convert the digital luminance signal (Y) to an analog signal.

The memory control circuit 12 also actuates the writing address counter incorporated therein in accordance with the reading clock signal output from the clock generating circuit 19 to read digital data of the color difference signals (Pr) and (Pb) at predetermined addresses of the Pr-memory 16B and Pb-memory 16C. At the same time, the D/A converters 20B and 20C operate to convert the digital color difference signals to analog signals.

The selection of the writing and reading control of the memories in the memory control circuit 12 is controlled in accordance with a mode switching command signal output from the system control circuit 10.

The horizontal and vertical synchronizing signals (SH) from the synchronizing signal separating circuit 13 and the horizontal and vertical synchronizing signals (S) from the synchronizing signal generating circuit 18 are also input to the system control circuit 10. The system control circuit 10 controls the phase of rotation of the spindle motor 5 in accordance with the signals (SH, S), which can be used as timing signals for other operations.

In the high definition recording as mentioned above, the reading clock signal from the clock generating circuit 19 has a frequency less than that of the writing clock signal from the clock generating circuit 14. In the illustrated embodiments, the frequency of the reading clock signal is one fourth the writing clock signal. Consequently, the frequency of the reading clock signal of the color difference signals is half that of the writing clock signal. Thus, the input image signals are recorded on the magnetic disc 3 with an extended time base. Namely, the difference in frequency between the writing clock signals and the reading clock signals makes it possible to extend or compress the time base.

The high frequency bands of the analog luminance signal (Y) and color difference signals (Pr, Pb) are cut by the low band pass filters 21A, 21B and 21C. Thereafter, vertical and horizontal synchronizing signals (S) output from the synchronizing signal generating circuit 18 are added thereto by the synchronizing signal adding circuits 22A, 22B and 22C.

Terminals a, b, and c of selection switch 23 are connected to the synchronizing signal adding circuits 22A, 22B, and 22C, respectively. The selection of the terminals a, b, and c to be connected is controlled by the system controlling circuit 10, so that the luminance signal (Y+S), the color difference signals (Pr+S) and (Pb+S) are successively input to the record processing circuit 24A which FM-modulates the input signals.

The system control circuit 10 outputs the field recording/frame recording mode, the field number (in the case of the frame recording), standard image recording/high definition image recording, the type of the image signals to be recorded, i.e., luminance signal (Y+S)/color difference signal (Pr+S)/color difference signal (Pb+S), parts of one picture plane (for example, upper left, lower left, upper right, and lower right portions of a picture plane divided into four parts), the track number, and ID data such as photographing dates (i.e., year, month, day). The ID record processing circuit 25 DPSK-modulates the carrier (i.e., carrier wave) generated in accordance with the horizontal synchronizing signal (S) from the synchronizing signal generating circuit 18, in accordance with the ID data mentioned above, to obtain a DPSK signal.

The DPSK signal of the ID data is combined with the picture signal which has been FM-modulated in the record processing circuit 24 by the adder 26. The picture signal thus combined by the adder 26 is amplified by the record amplifier 27 which is controlled by the system control circuit 10 and is recorded on the predetermined track of the magnetic disc 3. During recording, the magnetic disc 3 is rotated at a constant speed.

Since the picture image signals corresponding to one picture plane are recorded on a plurality of tracks with an extended time base in the high definition recording mode, the storage of data in memories 16A through 16C is carried out as follows.

Figure 3:
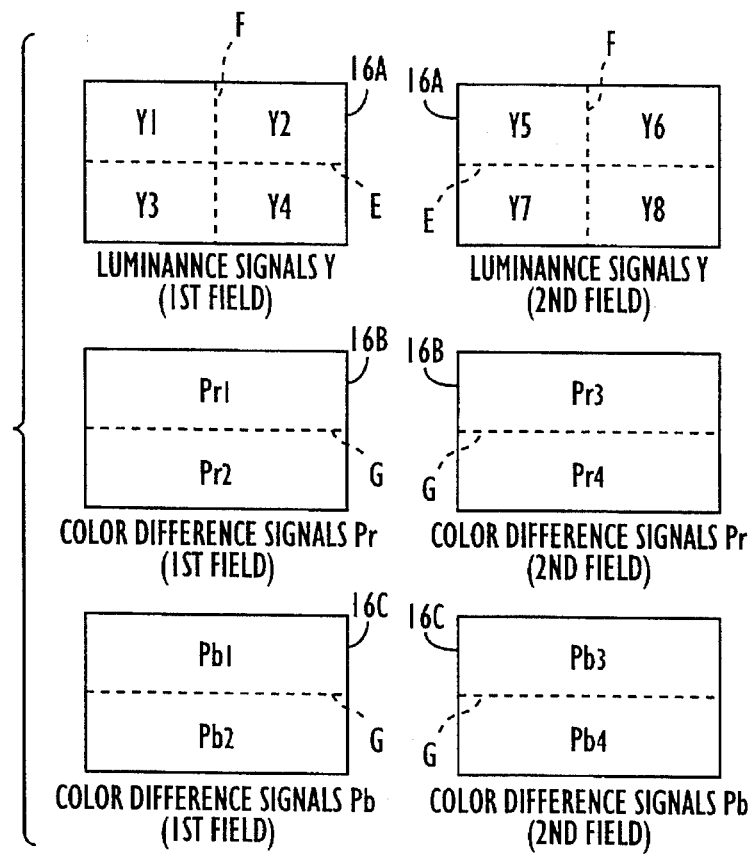
FIG. 3 is a schematic view of a storing zone pattern of picture image signals in each memory in a high definition recording mode.

FIG. 3 shows a pattern of storing zones for the image signals in the memories 16A through 16C by way of example. In this example, applied to the high definition picture image recording the image signal is recorded in the frame recording mode and the luminance signal (Y) and the color difference signals (Pr, Pb) are recorded on multiple tracks. A single picture plane consists of first and second fields. The luminance signal (Y) is divided into four areas of one picture plane. The color difference signals (Pr) and (Pb) are divided into two areas of one picture plane, so that these signals can be stored in the corresponding memories 16A through 16C. Note that, in FIG. 3, the arrangement of the storing zones in the memories corresponds to the structure of the picture plane (i.e., still picture image) indicated in the display.

With respect to the luminance signal (Y) the picture plane is divided into four areas by horizontal and vertical center lines E and F. In the first field, the luminance signals Y1, Y2, Y3, and Y4 corresponding to the upper left area, upper right area, lower left area and lower right area of the picture plane divided into four areas, respectively, are stored in respective first, second, third, and fourth areas of the Y-memory 16A.

With respect to the color difference signal (Pr), the picture plane is split into two areas by a center horizontal line G. In the first field, the color difference signals Pr1 and Pr2, corresponding to the upper half and lower half of the split picture plane, respectively, are stored in respective fifth and sixth areas of the Pr-memory 16B.

With respect to the color difference signal (Pb), the picture plane is split into two areas by a center horizontal line G. In the first field, the color difference signals Pb1 and Pb2, corresponding to the upper half and lower half of the split picture plane, respectively, are stored in respective seventh and eighth areas of the Pb-memory 16C.

The above discussion for the first field can be applied to the second field. Namely, the luminance signals Y5, Y6, Y7, and Y8 corresponding to the upper left area, upper right area, lower left area, and lower right area of the picture plane divided into four areas, respectively, are stored in respective ninth, tenth, eleventh and twelfth areas of the Y-memory 16A. The color difference signals Pr3 and Pr4 corresponding to the upper half and lower half of the split picture plane, respectively, are stored in respective thirteenth and fourteenth areas of the Pr-memory 16B. The color difference signals Pb3 and Pb4, corresponding to the upper half and lower half of the split picture plane, respectively, are stored in respective fifteenth and sixteenth areas of the Pb-memory 16C.

Figure 4:
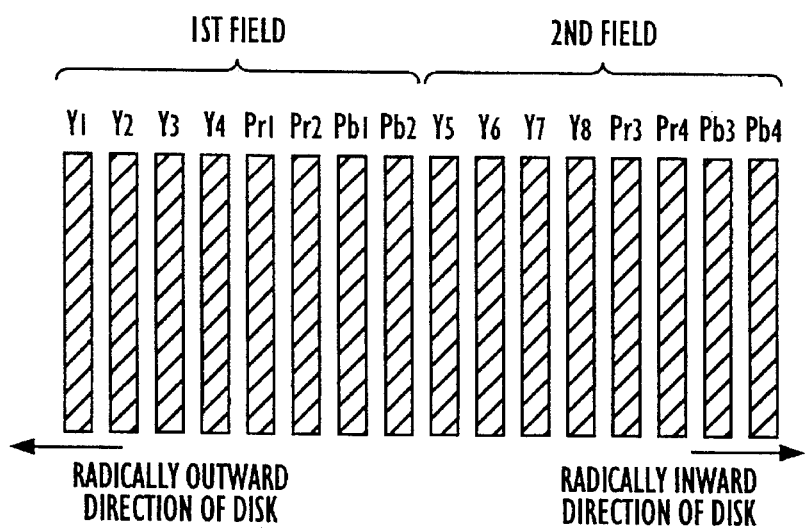
FIG. 4 is a schematic view of a track pattern formed on a magnetic disc in a high definition recording mode, by way of example.

FIG. 4 shows an example of a track pattern formed on the magnetic disc 3. As shown in FIG. 4, the picture image signals for one picture plane are recorded on 16 tracks which are juxtaposed in the radial direction of the magnetic disc 3. In this case, the picture image signals corresponding to the first field are recorded on 8 continuous tracks. The picture image signals corresponding to the second field are also recorded on 8 continuous tracks. In the illustrated arrangement, the luminance signals Y1, Y2, Y3 and Y4 in the first field; the color difference signals Pr1 and Pr2 in the first field; the color difference signals Pb1 and Pb2 in the first field; the luminance signals Y5, Y6, Y7 and Y8 in the second field; the color difference signals Pr3 and Pr4 in the second field; and, the color difference signals Pb3 and Pb4 in the second field are continuously recorded on successive tracks in this order from the outer periphery of the disk towards the center of the magnetic disc 3.

Figure 5:
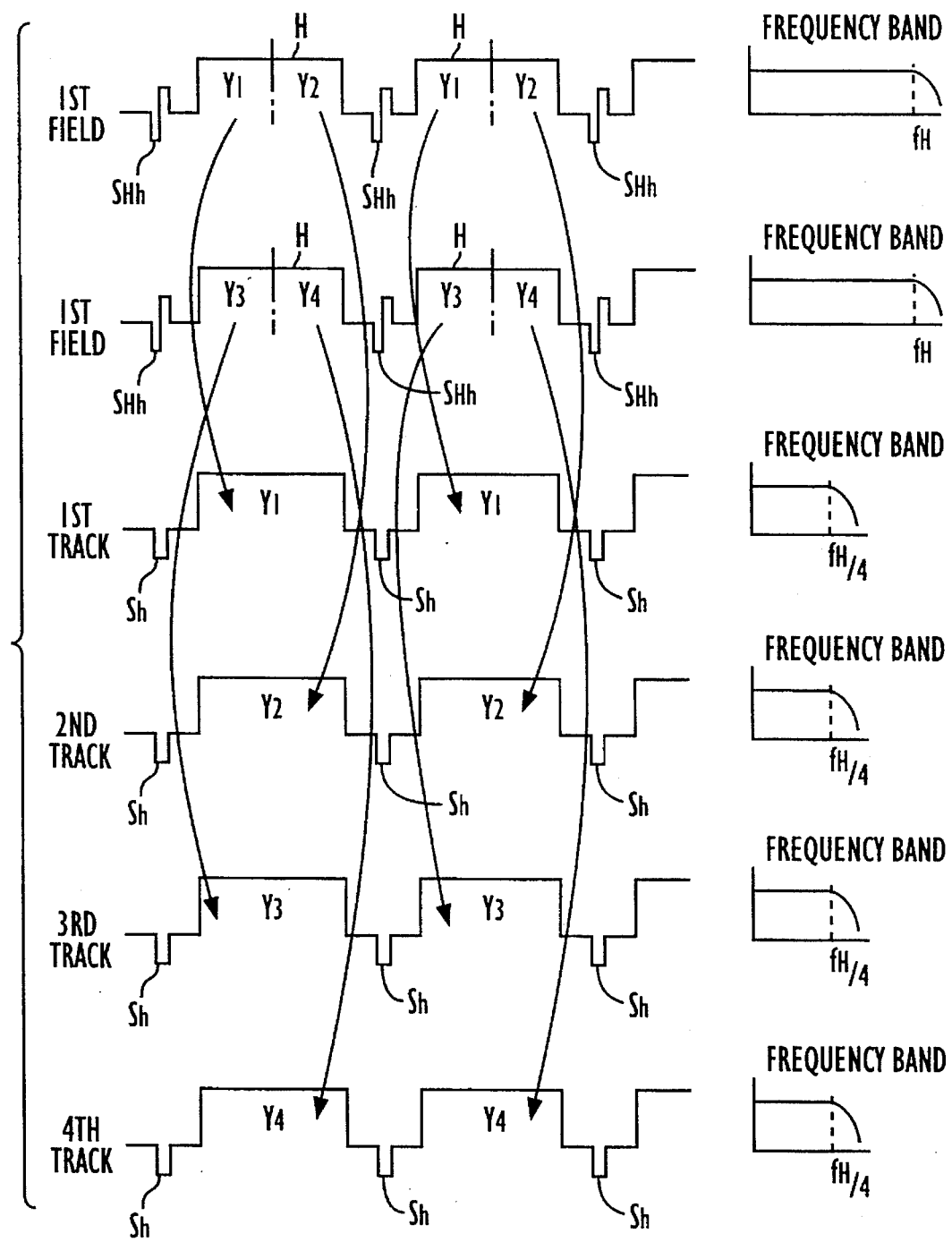
FIG. 5 is a time chart which shows a relationship between luminance signals (Y) input to a recording system of a still video apparatus and luminance signals (Y) recorded on tracks, in a high definition recording mode.

FIG. 5 shows a time chart of the luminance signals (Y) input to the recording system of the still video apparatus and the luminance signals (Y) recorded on the tracks in the high definition recording mode. One picture plane consists of first and second fields. In FIG. 5, only the luminance signal of the first field is illustrated. The luminance signal in the first field consists of a large number of horizontal scanning lines H, wherein the luminance signal corresponding to one horizontal scanning line H exists in the two adjacent horizontal synchronizing signals SHh (referred to as horizontal synchronizing period).

Upon recording the luminance signals, terminal "a" of the selection switch 23 is connected, so that the magnetic head 6 is moved from the first track, which is located on the outermost side of the magnetic disc 3, to the fourth track. Namely, when the luminance signal Y1 is recorded, the magnetic head 6 is moved to the first track. Similarly, when the luminance signals Y2, Y3, and Y4 are recorded, the magnetic head 6 is moved to the second, third and fourth tracks of the magnetic disc 3 to record the luminance signals, respectively (see FIG. 4). Note that an "$N^{th}$" track does not refer to a track number reckoned from the outermost track of the magnetic disc 3, but refers to a track number determined from a reference track.

As can be seen in FIG. 5, assuming that the frequency band of the luminance signals Y1 through Y4 to be written in the Y-memory 16A is fH. The frequency band of the luminance signals Y1 through Y4 recorded on the first through fourth tracks is equal to fH/4, since the time base of the luminance signals is extended by four times when the luminance signals are read from the Y-memory 16A. In view of the characteristics of the magnetic disc 3, the upper limit of the frequency band which can be recorded is low, but according to the arrangement discussed above, the luminance signals of the frequency band higher than the upper limit can be recorded, thus resulting in a realization of the recording of the high definition picture images.

Figure 6:
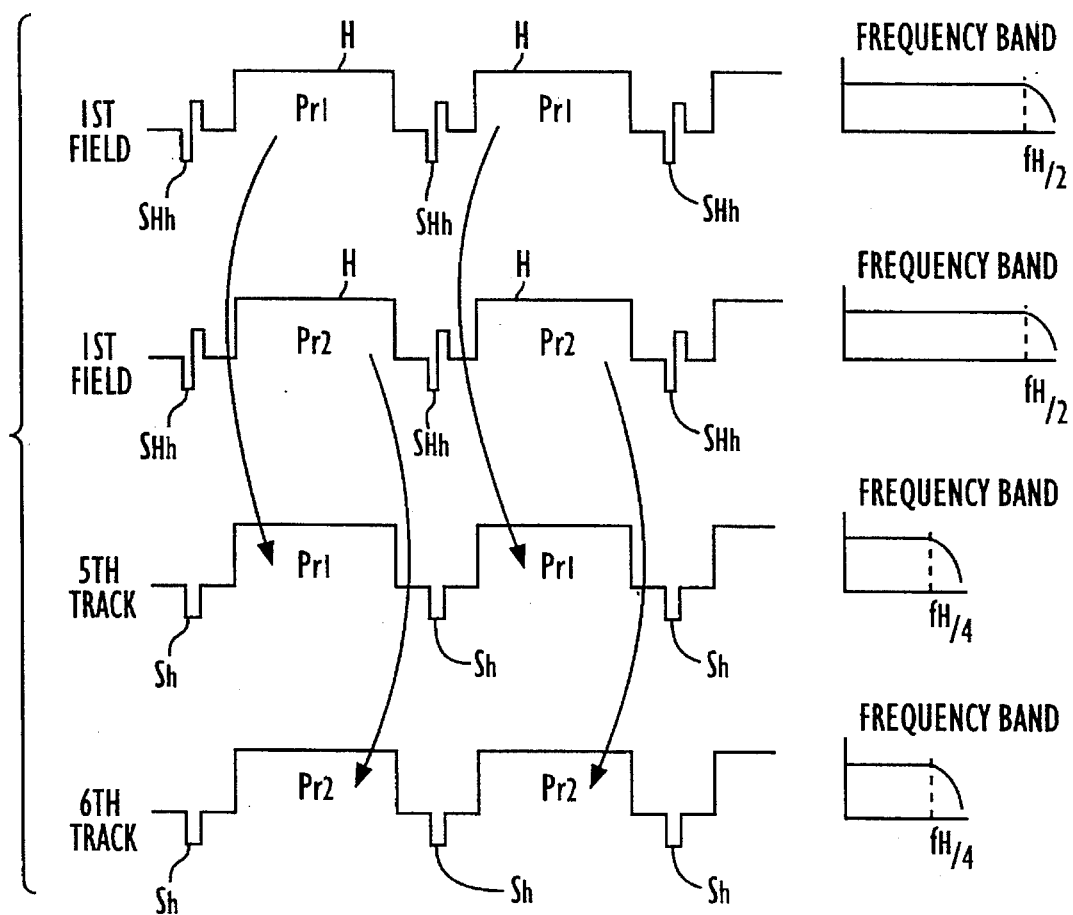
FIG. 6 is a time chart which shows a relationship between color difference signals (Pr) input to a recording system of a still video apparatus and color difference signals (Pr) recorded on tracks, in a high definition recording mode.

FIG. 6 shows a time chart of the color difference signal (Pr) input to the recording system of the still video apparatus and the color difference signal (Pr) recorded on the tracks at the high definition recording mode. One picture plane consists of first and second fields. In FIG. 6, only the color difference signal (Pr) of the first field is illustrated. The color difference signal in the first field consists of a large number of horizontal scanning lines H, wherein the color difference signal corresponding to one horizontal scanning line H exists within the horizontal synchronizing period.

Upon recording the color difference signals, terminal "b" of the selection switch 23 is connected, so that the magnetic head 6 is successively moved from the fifth track of the magnetic disc 3 to the sixth track. Consequently, the color difference signals Pr1 and Pr2 are recorded on the fifth and sixth tracks, respectively (see FIG. 4).

As can be seen in FIG. 6, the frequency band of the color difference signals Pr1 and Pr2 written in the Pr-memory 16B is identical to fH/2. The frequency band of the color difference signals Pr1 and Pr2 recorded on the fifth and sixth tracks would be fH/4, since the time base of the color difference signals is extended twice when the color difference signals are read from the Pr-memory 16B.

When the color difference signal (Pb) is recorded, terminal "c" of the selection switch 23 is connected, so that the magnetic head 6 is moved to the seventh and eighth tracks. Consequently, the color difference signals Pb1 and Pb2 are recorded on the seventh and eighth tracks at a frequency band of fH/4, respectively, similar to the color difference signals Pr discussed above.

The above discussion for the first field is true for the luminance signals Y5 through Y8, the color difference signals Pr3, Pr4, Pb3, and Pb4 in the second field. Namely, these signals are recorded on the (N+8) tracks (N=1 through 8), as shown in FIG. 4.

Note that the synchronizing signals to be recorded on the magnetic discs 3 are not the synchronizing signals (SH) for the high definition picture images, but are, for example, synchronizing signals (s), according to the NTSC system. In FIGS. 5 and 6, only the horizontal synchronizing signals SH are shown.

[Standard Recording Mode]

When the standard recording mode is selected by the manual operation of the recording system selecting switch 82a of the operating portion 8, terminals "n" of the selection switches 51, 52, 53, 54, 55, 56, 57, and 58 that constitute a part of the recording mode switching means are connected.

As shown in FIG. 1, for example, when the composite video signal (NTSC) is input as the standard TV signal, the composite video signal is separated into the luminance signal (Y+S), the color difference signal (Pr), and the color difference signal (Pb).

The separated luminance signal (Y+S) passes through the low band pass filter 11A wherein the high frequency component thereof, which could be reflected noise due to sampling, is cut. Thereafter, the horizontal and vertical synchronizing signals (S) are separated from the luminance signal (Y+S) by the synchronizing signal separating circuit 13 and are input to the clock generating circuit 14. The clock generating circuit 14 generates the writing clock signals, which are reference signals for writing data into the memories. The clock signals are input to the memory control circuit 12 and the A/D converter 15A, respectively.

The luminance signal (Y), from which the horizontal and vertical synchronizing signals S have been separated, is converted to a digital signal by the A/D converter 15A and is stored in the Y-memory 16A. The color difference signal (Pr) past the low band pass filter lib is converted to a digital signal by the A/D converter 15B and is stored in the Pr-memory 16B. Similarly, the color difference signal (Pb) past the low band pass filter 11C is converted to a digital signal by the A/D converter 15C and is stored in the Pb-memory 16C.

Since terminals "n" of the selection switches 56 through 58 are connected as mentioned above, even if the high definition picture image signals are input, they are not stored in the memories 16A through 16C. Consequently, no recording of the high definition picture image signals onto the magnetic disc 3 at the standard recording mode occurs.

The memory control circuit 12 performs the following control at predetermined times of writing into the memories 16A through 16C in accordance with the writing clock signals output from the clock generating circuit 14. Namely, the A/D converter 15A operates in response to the clock signal from the clock generating circuit 14 and the memory control circuit 12 actuates the built-in writing address counter to write the color difference signals (Pr) and (Pb) at predetermined addresses of the Pr-memory 16B and Pb-memory 16C.

The writing clock signals output from the clock generating circuit 14 are divided in half by the frequency divider 17A to actuate the A/D converters 15B and 15C. The memory control circuit 12 actuates the writing address counter incorporated therein to write digital data of the color difference signals (Pr) and (Pb) at predetermined addresses of the Pr-memory 16B and Pb-memory 16C. Note that the synchronizing signal ( S ) included in the input signals such as the luminance signal is not separated and, accordingly, is not written in the memory.

The horizontal and vertical synchronizing signals (S) corresponding to, for example, the NTSC system are output from the synchronizing signal generating circuit 18 and are input to the clock generating circuit 19. The clock generating circuit 19 generates the reading clock signals, which are reference signals for reading data from the memories and which are input to the memory control circuit 12 and the D/A converters 20A, 20B and 20C, respectively.

The memory control circuit 12 performs the following control at predetermined times of writing into the memories 16A through 16C in accordance with the writing clock signals output from the clock generating circuit 19. Namely, the memory control circuit 12 actuates the built-in reading address counter to read digital data of the luminance signal (Y) from the Y-memory 16A at predetermined addresses thereof. At the same time, the D/A converter 20A converts the digital signal of the luminance signal Y to an analog signal.

The memory control circuit 12 actuates the built-in writing address counter in accordance with the reading clock signal output from the clock generating circuit 19 to read digital data of the color difference signals (Pr) and (Pb) from the Pr-memory 16B and Pb-memory 16C at predetermined addresses thereof, respectively. The reading clock signals output from the clock generating circuit 19 are divided in half by the frequency divider 17B to actuate the D/A converters 20B and 20C, so that the digital color difference signals are converted to analog signals.

The mode change between the writing control and reading control of the memories within the memory control circuit 12 is controlled by the mode change command signal output from the system control circuit 10.

The horizontal and vertical synchronizing signals (S) from the synchronizing signal separating circuit 13 and the horizontal and vertical synchronizing signals (S) from the synchronizing signal generating circuit 18 are input to the system control circuit 10. These signals are used as timing signals to control the phase of rotation of the spindle motor 5, etc.

At the standard picture image recording, the reading clock signals from the clock generating circuit 19 and the writing clock signals from the clock generating circuit 14 have the same frequency. Consequently, the frequency of the reading clock signals for the luminance signals is the same as the frequency of the writing clock signals therefor. The frequency of the reading clock signals for the color difference signals is the same as the frequency of the writing clock signals therefor. In other words, the frequency of the writing and reading clock signals for the luminance signal are twice the frequency of the writing and reading clock signals for the color difference signals.

The high frequency components of the analog luminance signal (Y) and color difference signal (Pr) and (Pb) are cut by the low band pass filters 21A, 21B and 21C, respectively. Thereafter, the horizontal and vertical synchronizing signals (S) output from the synchronizing signal generating circuit 18 are added to the luminance signal (Y) by the synchronizing signal adding circuit 22A. Terminal "a" of the selection switch 23 is connected as mentioned above. Accordingly, the luminance signal (Y+S) is input to the record processing circuit 24A through the selection switch 23 and is FM-modulated.

Terminal "n" of the selection switch 53 is connected to the synchronizing signal adding circuit 22B, and terminal "n" of the selection switch 54 is connected to the synchronizing signal adding circuit 22C. Consequently, the color difference signals (Pr) and (Pb) are input to the C-signal recording and processing circuit 24B through the selection switches 53 and 54. The input color difference signals (Pr) and (Pb) are subject to line-frequency operation and FM-modulated by the C-signal recording and processing circuit 24B. The FM-demodulated color difference signals of line frequency are input to the adder 26 through the selection switch 55.

Various ID data signals are output from the system control circuit 10 similar to the high definition recording mode. The ID recording and processing circuit 25 executes the DPSK-modulation of the carrier produced in accordance with the horizontal vertical signal (S) from the synchronizing signal generating circuit 18, in accordance with the Id data signals, to obtain DPSK-signals.

The DPSK-signals, the FM-modulated luminance signal (Y+S) and the FM-modulated color difference signals (Pr, Pb) of line frequency are synthesized by the adder 26. The synthesized image signals are amplified by the recording amplifier 27 which is controlled by the system control circuit 10 and are recorded on the magnetic disc 3 which is being rotated at a constant speed at predetermined tracks of the magnetic disc by the magnetic head 6.

In case of field recording, the image signals corresponding to one picture plane are recorded on one track. Whereas in case of the frame recording, the image signals for the odd number and even number fields are recorded on the respective adjacent tracks. Namely, the picture signals for one picture plane are recorded on two tracks.

Figure 7:
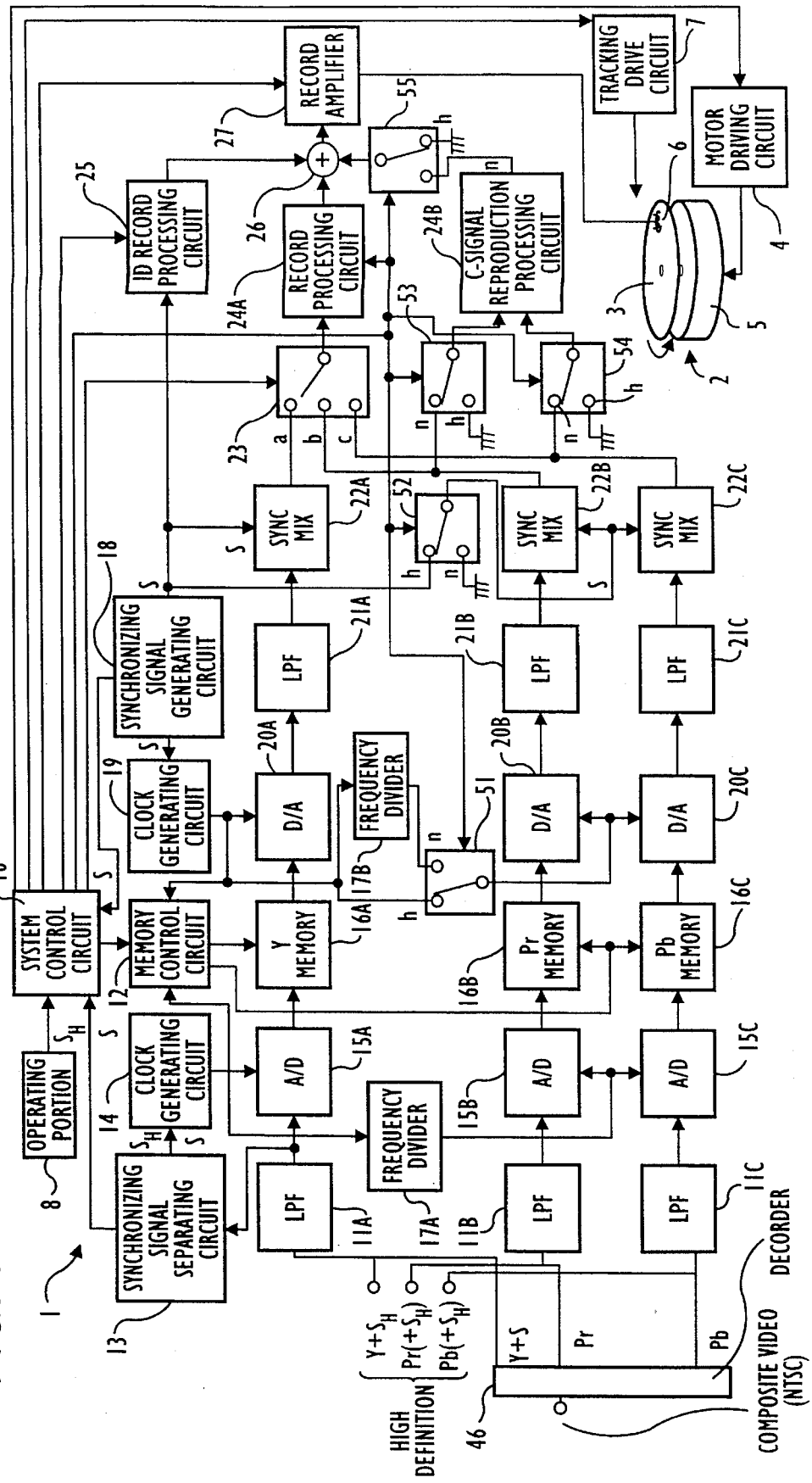
FIG. 7 is a block diagram of a recording system of a still video apparatus according to the present invention.
Figure 8:
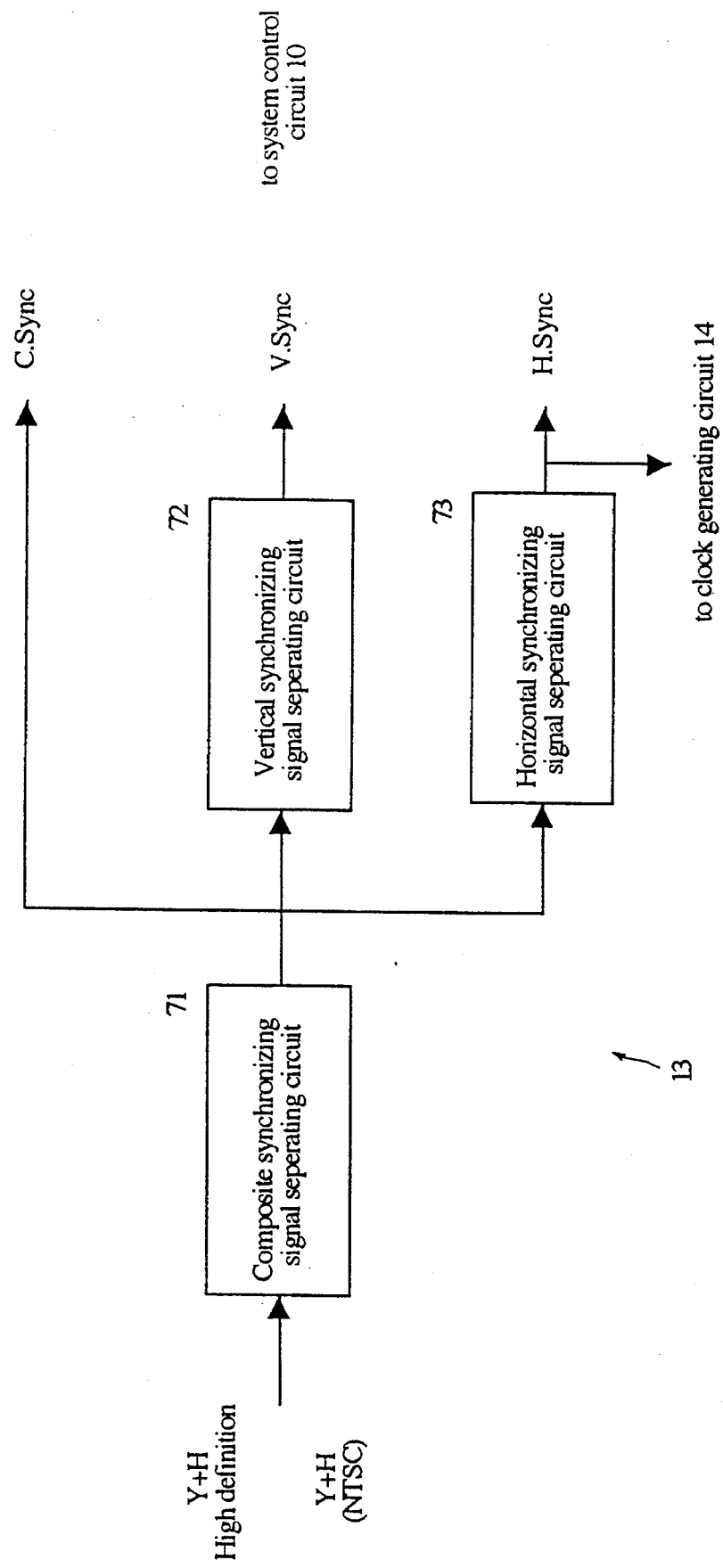
FIG. 8 is a block diagram of a circuit arrangement of a synchronizing signal separating circuit.

The following discussion will be addressed to the recording mode switching means for selecting the high definition recording mode and the standard recording mode. In the following discussion, the synchronizing signal separated from the luminance signal is detected, so that the recording system is automatically switched based on the detection result (FIG. 7 and 8). Note that the circuit arrangement of the video apparatus shown in FIG. 7 is substantially the same as that shown in FIG. 1 (switches 57 and 58 are absent in FIG. 7).

In FIG. 8, which is a block diagram of the synchronizing signal separating circuit 13 shown in FIG. 7, the composite synchronizing signal (C. Sync) is separated from the high definition luminance signal (Y+SH) or NTSC luminance signal (Y+S) input to the synchronizing signal separating circuit 13 by the composite synchronizing signal separating circuit 71, Moreover, the vertical synchronizing signal (V. Sync) and the horizontal synchronizing signal (H. Sync) are separated from the composite synchronizing signal by the vertical synchronizing signal separating circuit 72 and the horizontal synchronizing signal separating circuit 73, respectively. The composite synchronizing signal, the vertical synchronizing signal, and the horizontal synchronizing signal, thus separated, are input to the system control circuit 10. The horizontal synchronizing signal is also input to the clock generating circuit 14.

Figure 9:
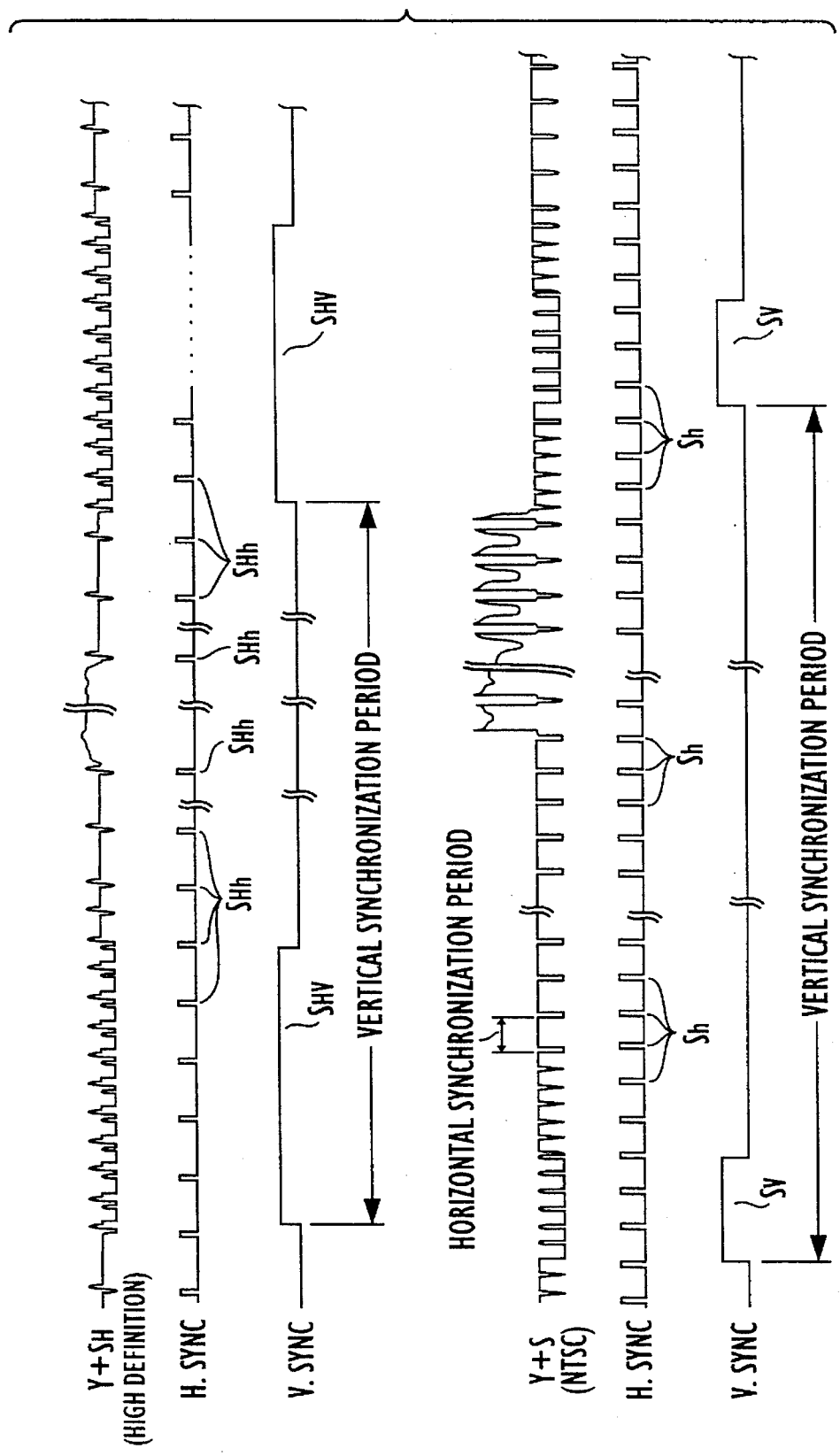
FIG. 9 is a time chart which shows luminance signals input to a recording system and separated vertical and horizontal synchronizing signals.

FIG. 9 shows a time chart of the luminance signal input to the recording means and the separated horizontal and vertical synchronizing signals.

Looking at the synchronizing signal separated from the high definition luminance signal (Y+SH), there are 562 or 563 horizontal synchronizing signals (SHh) between the rise portions of the two adjacent vertical synchronizing signals (SHV), i.e., within the vertical synchronization period. Similarly, for the synchronizing signal separated from the NTSC luminance signal (Y+S), there are 262 or 263 horizontal synchronizing signals (Sh) between the rise portions of the two adjacent vertical synchronizing signals (SV).

In the illustrated embodiment, the difference in number between the horizontal synchronizing signals is employed to differentiate between the high definition signal and the NTSC signal. Namely, the system control circuit 10 determines whether the picture image signals input to the recording means are high definition signals or NTSC signals by counting the number of horizontal synchronizing signals within the vertical synchronization period to thereby automatically switch the recording mode by the recording mode switching means.

The horizontal synchronizing signals that are to be counted are those input to the recording system. The change of the recording system must be completed prior to the actual recording of the image signals.

Figure 10:
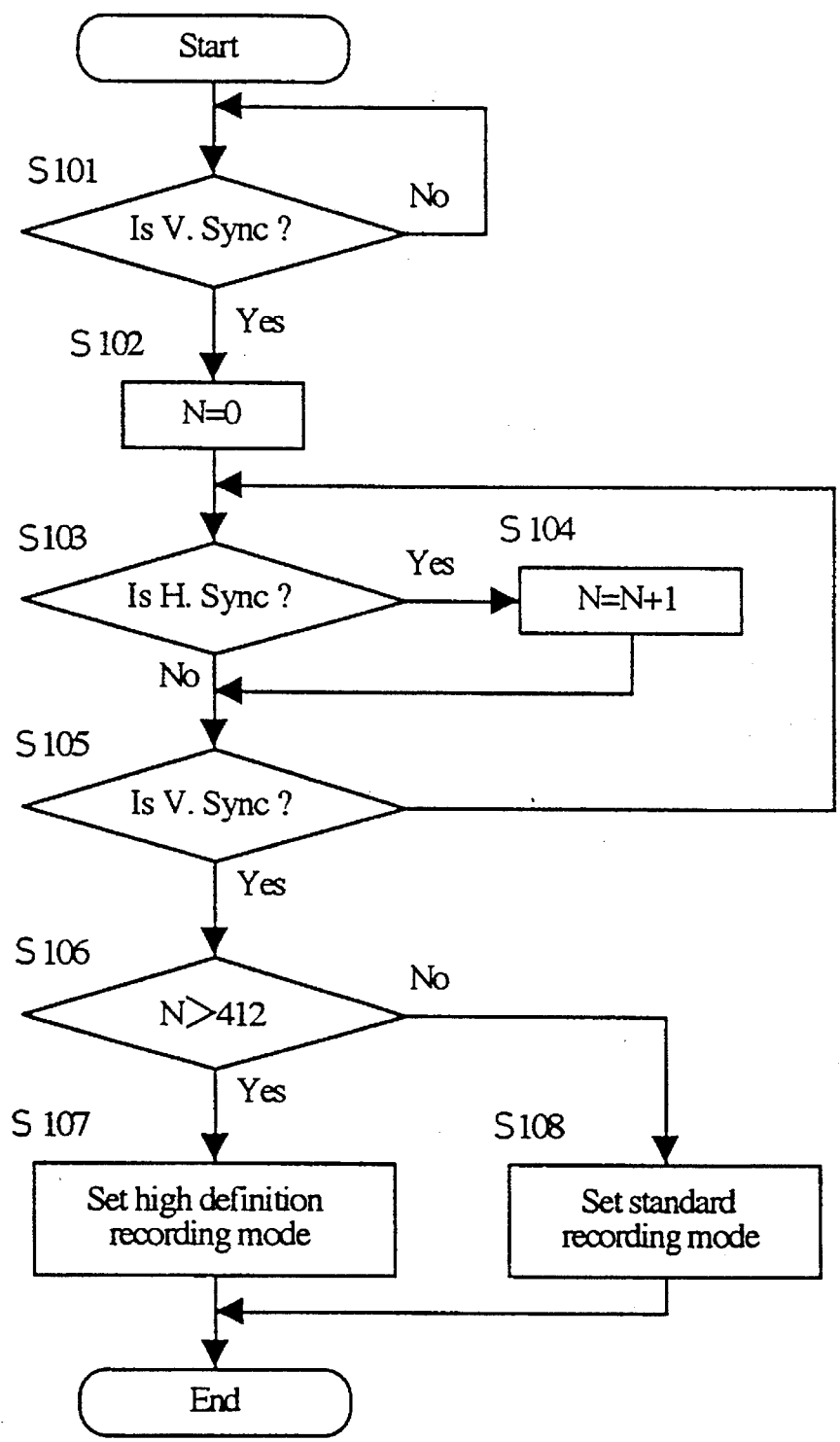
FIG. 10 is a flow chart which shows a control operation in which a switching operation of a recording mode switching means is automatically carried out in accordance with input picture image signals.

In FIG. 10, which shows a flow chart of the control operation of the system control circuit 10 for carrying out automatic switching of the recording mode switching means, the operation starts when the vertical synchronizing signals are output, which is detected in accordance with the synchronizing signals separated by the synchronizing signal separating circuit 13 and input to the system control circuit 10 (step S101).

If the vertical synchronizing signal is output, the counter is set to be zero (N=0), at step S102. The number N of the counter is increased every time the horizontal synchronizing signals are detected and continued until the subsequent vertical signal is output ( steps S103 through S105).

If the subsequent vertical synchronizing signal (V. Sync) is detected, whether the counted value N is above 412 is checked (step S106). If N is larger than 412, the mode is switched to the high definition recording mode (step S107). Conversely, if N is not more than 412, the standard recording mode is selected (step S108).

Upon completion of the selection of the recording mode, predetermined picture image signals are recorded at the selected recording mode.

The recording operation in the high definition recording mode or the standard recording mode will be discussed below.

As mentioned above, if N>412 at step S106, the high definition recording mode is automatically selected (in the case of the automatic switching mode). On the other hand, in case of the manual switching mode, the high definition recording mode is selected by the manual operation of the selection switch 8a of the operation portion 8. Similarly, in case of the automatic selection, the standard recording mode is automatically selected if N≦412 at step S106, whereas in the case of the manual selection, the standard recording mode is selected by the manual operation of the selection switch 8a.

Figure 11:
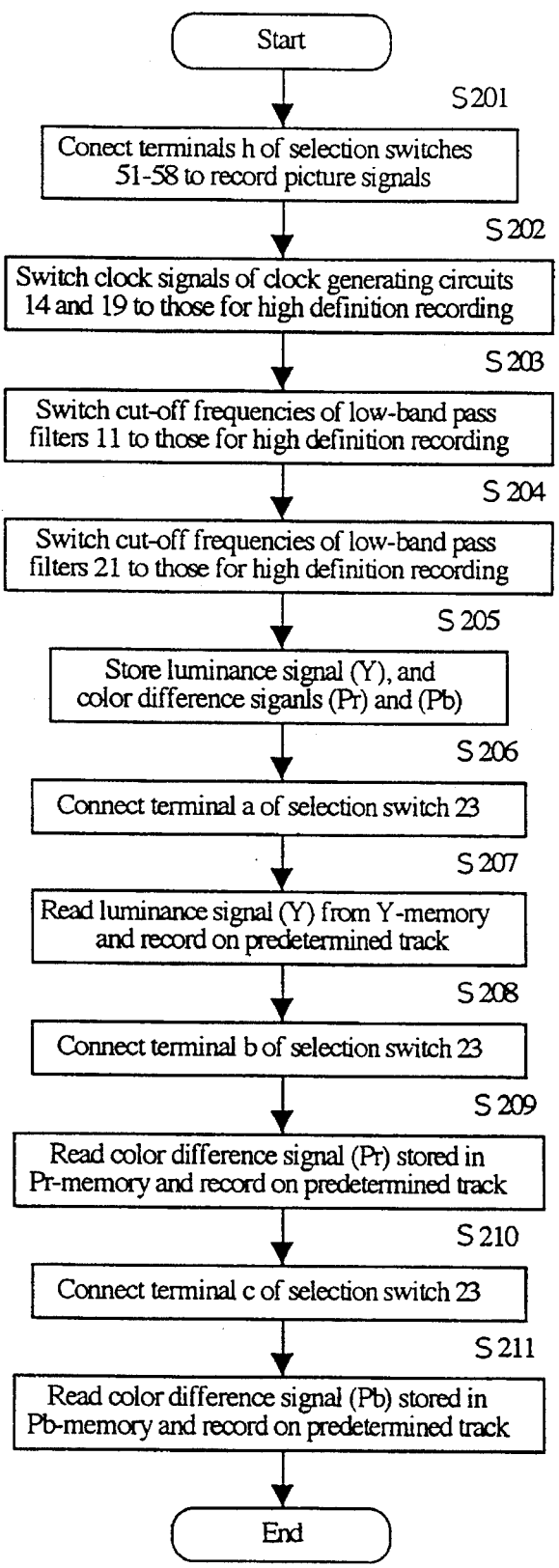
FIG. 11 is a flow chart of a recording operation in a high definition recording mode.
Figure 12:
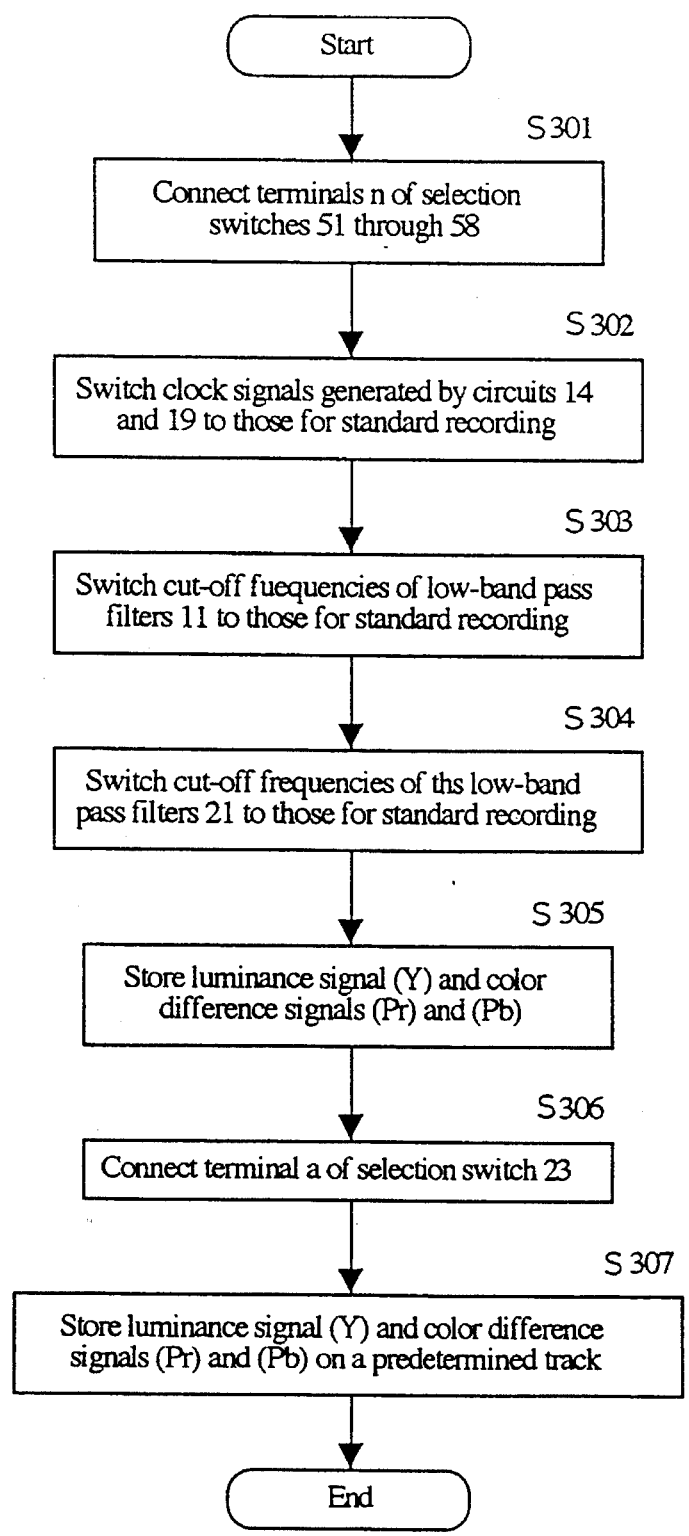
FIG. 12 is a flow chart of a recording operation in a standard recording mode.

FIGS. 11 and 12 show flow charts of the control operation in the high definition recording mode and standard recording mode, respectively.

As can be seen in FIG. 11, terminals "h" of the selection switches 51 through 58 are connected to record picture signals at the high definition recording mode (step S201). Thereafter, the clock signals generated by the clock generating circuits 14 and 19 are switched to those for high definition recording (step S202). In the illustrated embodiment, the frequency of the clock signals generated by the clock generating circuit 14 is four times the frequency of the clock signals generated by the clock signal generating circuit 19.

Subsequently, the cut-off frequencies of the low band pass filters 11a through 11C are switched to those for the high definition recording (step S203). In the illustrated embodiment, the cut-off frequencies of the low band pass filters 11A through 11C are one half of the sampling frequencies of the A/D converters 15A through 15C.

Thereafter, the cut-off frequencies of the low band pass filters 21A through 21C are switched to those for the high definition recording (step S204). In the illustrated embodiment, the cut-off frequencies of the low band pass filters 21B and 21C are one half of the sampling frequencies of the D/A converters 20B and 20D.

Thus, the cut-off frequencies of the low band pass filters 11A through 11C, the sampling frequencies of the A/D converters 15A through 15C, the writing frequencies for the memories 16A through 16C, the reading frequencies for the memories 16A through 16C, the sampling frequencies of the D/A converters 20A through 20C, and the cut-off frequencies of the low band pass filters 21A through 21C are set as shown in Table 1 below.

TABLE 1

| | (High definition recording mode) | | | |
|---|---|---|---|---|
| | LPF | A/D, write memory | read memory, D/A | LPF |
| Luminance signal (Y) | 2f (11A) | 4f (15A, 16A) | f (16A, 20A) | f/2 (21A) |
| Color difference signal (Pr) | f (11B) | 2f (15B, 16B) | f (16B, 20B) | f/2 (21B) |
| Color difference signal (Pb) | f (11C) | 2f (15C, 16C) | f (16C, 20C) | f/2 (21C) |

"f" is, for example, 18.6 MH$_z$
( ) indicates numeral(s) in drawing(s).

When the above mentioned frequencies are set as shown in Table 1 , the luminance signal (Y), and the color difference signals (Pr) and (Pb) are stored in the memories 16A through 16C (step S205). Thereafter, terminal "a" of the selection switch 23 is connected (step S206), and then the luminance signal (Y) stored in the Y-memory 16A is read and recorded on the magnetic disc 3 at a predetermined track (step S207).

Thereafter, terminal "b" of the selection switch 23 is connected (step S208). Then, the color difference signal (Pr) stored in the Pr-memory 16B is read to be recorded on the magnetic disc 3 at a predetermined track (step S209).

Thereafter, terminal "c" of the selection switch 3 is connected (step S210). Then, the color difference signal (Pb) stored in the Pb-memory 16C is read and recorded on the magnetic disc 3 at a predetermined track (step S211).

The picture image signals corresponding to the first field are thereby recorded on 8 tracks. Similarly, the picture image signals corresponding to the second field are recorded on 8 tracks different from the first mentioned 8 tracks by repeating the same operation. This completes the recording of the picture image signals for one picture plane, in the track pattern shown in FIG. 4.

Upon recording picture image signals in the standard recording mode, terminals "n" of the selection switches 51 through 58 are connected, as shown in FIG. 12 (step S301). Then, the clock signals generated by the clock generating circuits 14 and 19 are switched to those for the standard recording (step S302). Note that the frequency of the clock signal generated by the clock generating circuit 14 is the same as that generated by the clock generating circuit 19.

Thereafter, the cut-off frequencies of the low band pass filters 11A through 11C are switched to those for the standard recording (step S303). In the illustrated embodiment, the cut-off frequencies of the low band pass filters 11A through 11C are half the sampling frequencies of the A/D converters 15A through 15C.

Thereafter, the cut-off frequencies of the low band pass filters 21A through 21C are switched to those for the standard recording (step S304). In the illustrated embodiment, the cut-off frequencies of the low band pass filters 21B and 21C are half the sampling frequencies of the D/A converters 20B and 20C.

Thus, the cut-off frequencies of the low band pass filters 11A through 11C, the sampling frequencies of the A/D converters 15A through 15C, the writing frequencies for memories 16A through 16C, the reading frequencies for memories 16A through 16C, the sampling frequencies of D/A converters 20A through 20C, and the cut-off frequencies of low band pass filters 21A through 21C are set as shown in Table 2 below.

TABLE 2

| | (Standard recording mode) | | | |
|---|---|---|---|---|
| | LPF | A/D, write memory | read memory, D/A | LPF |
| Luminance signal (Y) | f/2 (11A) | f (15A, 16A) | f (16A, 20A) | f/2 (21A) |
| Color difference signal (Pr) | f/4 (11B) | f/2 (15B, 16B) | f/2 (16B, 20B) | f/4 (21B) |
| Color difference signal (Pb) | f/4 (11C) | f/2 (15C, 16C) | f/2 (16C, 20C) | f/4 (21C) |

"f" is, for example, 14.3 MH$_z$
( ) indicates numeral(s) in drawing(s).

After the above mentioned frequencies are set as shown in Table 2, the luminance signal (Y) and the color difference signals (Pr) and (Pb) are stored in the memories 16A through 16C (step S305).

Thereafter, after the terminal "a" of the selection switch 23 is connected (step S306), and the luminance signal (Y) and the color difference signals (Pr) and (Pb), stored in the memories 16A through 16C, are simultaneously read. The luminance signal (Y) is subject to a predetermined recording process (i.e., luminance signal recording process) by the record processing circuit 24A. The color difference signals (Pr) and (Pb) are subject to a predetermined recording process (i.e., color difference signal recording process) by the C-signal recording and processing circuit 24B. Thereafter, the luminance signal (Y) and the color difference signals (Pr) and (Pb) are recorded on the magnetic disc 3 at a predetermined track (step S307). Thus, the picture image signals corresponding to the first field are recorded on one track, and the picture image signals corresponding to the second field are recorded on another track.

[Reproduction]

Figure 2:
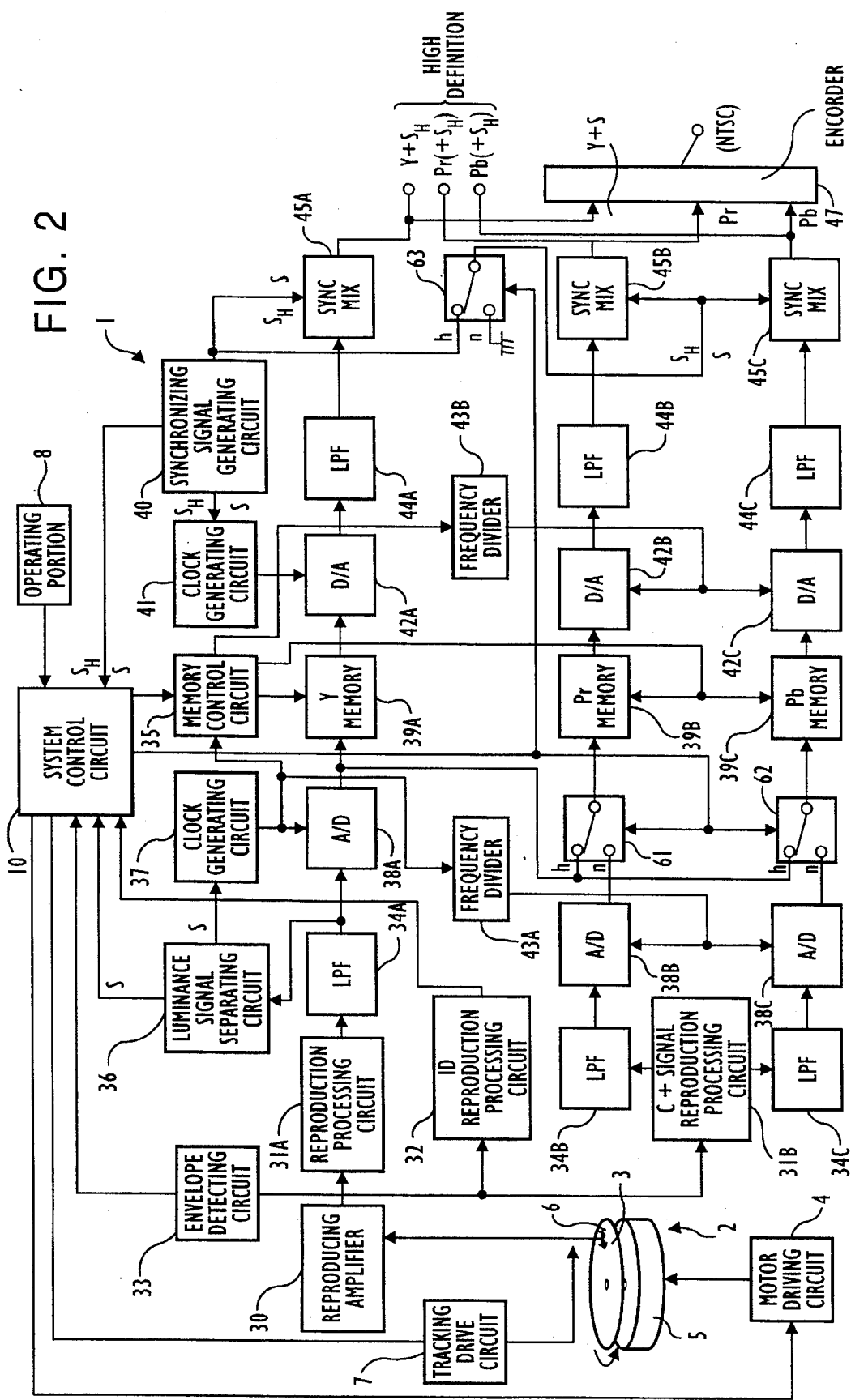
FIG. 2 is a block diagram of a reproducing system of a still video apparatus according to the present invention.

Reproduction of the recorded image in the still video apparatus will be described below. In FIG. 2, which shows a block diagram of an circuit arrangement for reproducing the recorded signals in a still video apparatus 1 according to the present invention, the magnetic disc driving mechanism 2 including the magnetic disc 3, the motor driving circuit 4, the spindle motor 5, the magnetic head 6, the tracking drive circuit 7, the operating portion 8, the indicator (not shown), and the system control circuit 10 are substantially the same as those for recording, shown in FIG. 1. Some components can be commonly used for recording and reproducing.

The still video apparatus 1 includes a reproduction mode switching means for switching the reproduction processing system depending on the signal processing system of the picture image signals recorded on the magnetic disc 3. The reproduction mode switching means discriminates the record processing system in accordance with, for example, the ID data. The reproduction mode switching means switches the reproduction mode to the standard reproduction mode when the images are recorded in the standard recording mode and switches the reproduction mode to the high definition reproduction mode when the images are recorded in the high definition recording mode, respectively. In the illustrated embodiment, the processing system of the image signals is discriminated depending on the recording system information included in the ID data representing standard recording or high definition recording.

In the still video apparatus 1, according to the present invention, it is possible to switch the reproduction processing system corresponding to the most recent recording system. The recording mode switching means (i.e., selection switch 8a) therefore discriminates the most recent record processing system in accordance with information on the record processing system of the recording means, and switches the reproduction mode to the standard reproduction mode to reproduce the standard picture image signals (i.e., standard TV signals) when the most recent recording system is the standard recording system, and switches the reproduction mode to the high definition reproduction mode to reproduce high definition picture image signals (i.e., HDTV signals) when the most recent recording system is the high definition recording system, respectively.

In the illustrated embodiment, the most recent recording system is detected in accordance with the signals to be input to the system control circuit 10 to represent the state of the selection switch 8a of the operating portion 8 (i.e., standard recording mode or high definition recording mode), the signals output from the system control circuit 10 in accordance therewith, or the recording system data representing the recording system for the automatic switching of the recording mode, as follows.

Figure 16:
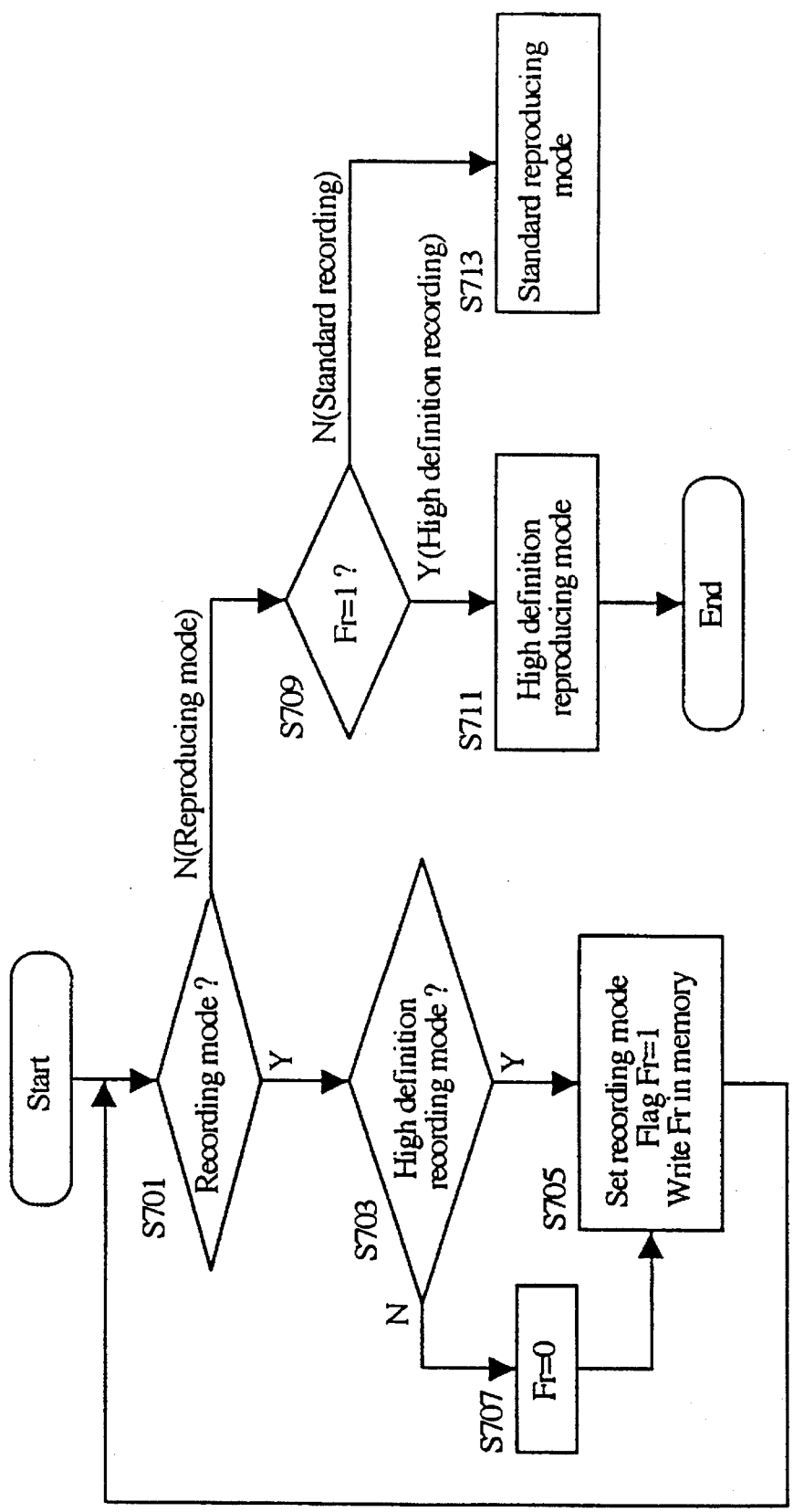

In FIG. 16, which shows a flow chart of the control operation of the system control circuit 10 for carrying out automatic switching of the reproducing mode.

If the recording mode is set, it is determined whether the high definition recording system is selected (steps S701, S703). If the high definition recording system is selected, set flag Fr, which indicates the high definition recording system, is stored in a built-in memory of the system control circuit 10 (steps S703, S705). If the high definition recording system is not selected, the flag Fr is reset (steps S703, S707).

If the reproduicing mode is set, whether the flag Fr is "1" is checked (steps S701, S709). If the flag Fr is "1", the high definition reproducing mode (steps S709, S711). Cnversely, if flag Fr is not "1", the standard reproducing mode is selected (steps S709, S713).

The data of the record processing system is stored in the built-in memory of the system control circuit 10. The data is renewed every time the recording operation is carried out. Consequently, the most recent recording system is stored in the memory. Accordingly, the most recent recording system data is read upon reproduction and can be used to switch the reproduction processing system.

Alternatively, it is also possible to provide a two-state selection switch 8a in the operating portion 8 in order to discriminate the latest recording system. In this alternative, the state of the selection switch 8a is detected to switch the reproduction processing system.

Selection of the reproduction processing system, in accordance with the most recent recording system, is particularly advantageous when the recorded picture images are directly reproduced. In such case, reproduction will be effected with the reproduction processing system corresponding to the most recent record processing system. This is the case, for example, when the recorded picture images are monitored immediately after recording.

In the still video apparatus 1, according to the illustrated embodiment, only the picture image signals recorded with the most recent recording system, which is detected by the reproduction mode switching means, is reproduced.

In the illustrated embodiment, the recording system of the picture images is detected for each track in accordance with the recording system data that represents the standard recording or the high definition recording, for example, the ID data. If the most recent recording system detected by the reproduction mode switching means is identical to the recording system detected in accordance with the ID data, reproduction is permitted. Conversely, if there is a discrepancy therebetween, reproduction is not permitted. Consequently, inappropriate reproduction of the picture image signals is prevented.

Hereinafter, the case in which the reproduction mode is automatically switched in accordance with the recording mode of the picture image signals to be reproduced will be referred to as an "automatic switching mode", and the case in which the reproduction mode is switched in accordance with the latest recording mode will be referred to as a "fixed mode". Alternatively, it is possible to manually switch the automatic switching mode and the fixed mode by a manual switch provided in the operating portion 8. Furthermore, it is also possible to provide only one of the automatic switching mode and the fixed mode.

[High Definition Reproduction Mode]

In the automatic switching mode, magnetic head 6 is moved to the predetermined track of the magnetic disc 3 to read the DPSK signals therefrom to thereby determine the picture image signals recorded on that track. As a result, if the high definition recording mode is detected, the system control circuit 10 switches the reproduction mode to the high definition reproduction mode and brings terminals "h" of the selection switches 61, 62, and 63 into a connected state. On the other hand, in the fixed mode, if the system control circuit 10 detects that the latest recording system is the high definition recording mode, terminals "h" of the selection switches 61, 62, and 63 are brought into a connected state. Note that terminal "n" of the selection switch is grounded. The subsequent reproducing operations which will be discussed hereinafter are applied to both the automatic switching mode and the fixed mode.

The system control circuit 10 moves the magnetic head 6 to the first track within the 16 tracks of the magnetic disc 3, as shown in FIG. 4. Thereafter, the magnetic head 6 is successively moved from the first track in the predetermined order to read the picture image signals and DPSK signals from the respective tracks.

In the illustrated embodiment, among the picture image signals recorded on the 16 tracks corresponding to one still picture image, the luminance signals Y1 through Y4 recorded on the outer tracks of the magnetic disc 3 are first read and written in the Y-memory 39A. Thereafter, the color difference signals Pr1 and Pr2 recorded on the inner tracks adjacent to the above mentioned four outer tracks are read and written in the Pr-memory 39B. After that, the color difference signals Pb1 and Pb2 recorded on the tracks, which are located inside the tracks for the color difference signals Pr1 and Pr2, are read and written in the Pb-memory 39C. Thus, the picture image signals corresponding to the first field are reproduced. Similarly, the luminance signals Y5 through Y8, the color difference signals Pr3, Pr4, Pb3, and Pb4, corresponding to the second field, are reproduced by repeating the above mentioned operations.

The picture image signals, etc., read by the magnetic head 6 are amplified by the reproducing amplifier 30. Thereafter, the luminance signal (Y+S), the color difference signal (Pr+S) and the color difference signal (Pb+S) are input to the reproduction processing circuit 31A through the high band pass filters to be FM-demodulated.

The DPSK signal which is read out is inputted to the ID reproduction processing circuit 32 through the band pass filter and is DPSK-demodulated to reproduce the ID data. The reproduced ID data is inputted to the system control circuit 10 which determines the recording system of the picture image signals read by the magnetic head 6 in accordance with the ID data to carry out or prohibit reproduction of the picture image signals.

The envelope detecting circuit 33 detects the envelope of the reproduced signal that has been read by the magnetic head 6 and amplified by the reproducing amplifier 30 and outputs the corresponding envelope detection signal to the system control circuit 10. The system control circuit 10 controls the tracking drive circuit 7 in such a manner that the output of the envelope detection signal is maximized, to perform the automatic tracking operation of the magnetic head 6. The automatic tracking of the magnetic head 6 and the phase control of the angular displacement of the spindle motor 5 provides for a good still picture image.

The high frequency components of the luminance signal (Y+S) and color difference signals (Pr+S) and (Pb+S), that have been FM-demodulated by the reproduction processing circuit 31A is cut by the low band pass filter 34A. Then, the horizontal and vertical synchronizing signals (S) are separated and extracted from the respective signals. They are then inputted to the system control circuit 10 and the clock generating circuit 37. The horizontal and vertical synchronizing signals (S) inputted to the system control circuit 10 are used, for example, to read the ID data. The clock generating circuit 37 generates the writing clock signals, which are reference signals, to write the data in the memories. The A/D converter 38A and the memory control circuit 35 operate in synchronization with the writing clock signals.

The FM-demodulated luminance signal (Y), from which the horizontal and vertical synchronizing signals (S) are separated, is converted to a digital signal by the A/D converter 38A and is stored in the Y-memory 39A at a predetermined address. The FM-demodulated color difference signal (Pr), from which the horizontal and vertical synchronizing signals (S) have been separated, is converted to a digital signal by the A/D converter 38B and is stored in the Pr-memory 39B through the switch 61. Similarly, the FM-demodulated color difference signal (Pb) is converted to a digital signal by the A/D converter 38C and is written in the Pb-memory 39C through the switch 62.

The system control circuit 10 determines whether the picture image signals read by the magnetic head 6 are the luminance signals Y1 through Y8, the color difference signals Pr1 through Pr4, or the color difference signals Pb1 through Pb4, based on the ID data to control the operation of the memory control circuit 35 in accordance with the determined signals. The memory control circuit 35 performs the following control in accordance with the writing clock signals outputted from the clock generating circuit 37 at a predetermined writing timing for the memories 39A through 39C.

Namely, the A/D converter 38A operates in response to the writing clock signal outputted from the clock generating circuit 37, and the memory control circuit 35 actuates the built-in writing address counter to write digital data of the luminance signals (Y) in the Y-memory 16A at predetermined addresses.

The memory control circuit 35 actuates the built-in writing address counter in accordance with the writing clock signals outputted from the clock generating circuit 37 to write digital data of the color difference signals (Pr) and (Pb) in the Pr-memory 39B and Pb-memory 39C at predetermined addresses, respectively. Sampling of the synchronizing signals (S) contained in the reproduced signals, such as the luminance signals, does not occur. Accordingly, no synchronizing signal is written in the memory.

The horizontal and vertical synchronizing signals (SH) corresponding to the high definition picture images are outputted from the synchronizing signal generating circuit 40 and are inputted to the clock generating circuit 41. The clock generating circuit 41 generates the reading clock signals which are reference signals to read the picture image signals from the respective memories. The generated reading clock signals are inputted to the memory control circuit 35 and the D/A converter 42A. The reading clock signals are divided in half by the frequency divider 43B and inputted to the D/A converters 42B and 42C.

The memory control circuit 35 carries out the following control in accordance with the reading clock signal outputted from the clock generating circuit 41 at predetermined reading times for the memories 39A through 39C. Namely, the memory control circuit 35 actuates the reading address counter incorporated therein in accordance with the reading clock signal outputted from the clock generating circuit 41 to read digital data of the luminance signals (Y) at the predetermined addresses of the Y-memory 39A. At the same time, the D/A converter 42A operates to convert the digital luminance signals (Y) to analog signals.

The memory control circuit 35 actuates the reading address counter incorporated therein in accordance with the reading clock signal outputted from the clock generating circuit 41 to read digital data of the color difference signals (Pr) and (Pb) at the predetermined addresses of the Pr-memory 39B and the Pb-memory 39C. At the same time, the D/A converters 42B and 42C convert the color difference signals to analog signals.

The memory control circuit 35 controls the writing and reading of data into and from the memories in accordance with the mode change command signal outputted from the system control circuit 10. The horizontal and vertical synchronizing signals (S) outputted from the synchronizing signal separating circuit 36, and the horizontal and vertical synchronizing signals (SH) outputted from the synchronizing signal generating circuit 40 are inputted to the system control circuit 10 which performs phase control of the spindle motor 5 rotation in accordance with the input signals. The latter can also be used as timing signals for other operations.

The frequency of the reading clock signal outputted from the clock generating circuit 41 is larger than the frequency of writing clock signal outputted from the clock generating circuit 37. In the illustrated embodiment, the former frequency is four times the latter frequency. Consequently, the frequency of reading clock signal for the luminance signal is four times the frequency of the writing clock signal and therefor, and the frequency of the reading clock signal for the color difference signals is twice the frequency of the writing clock signal. Owing to the difference in frequency, the time base of the signals read by the magnetic head 6 is compressed and reproduced in the original state (i.e., the state upon recording).

The high frequency components of the analog luminance signal (Y) and color difference signals (Pr) and (Pb) are cut by the low band pass filters 44A, 44B, and 44C, respectively. Thereafter, the horizontal and vertical synchronizing signals (SH) outputted from the synchronizing signals generating circuit 40 are added to the luminance signal and the color difference signals by the synchronizing signal adding circuits 45A, 45B, and 45C.

The luminance signal (Y+SH), the color difference signals (Pr+SH) and (Pb+SH), thus obtained, are outputted as video signals through respective outputting circuits (not shown), so that a still picture image can be reproduced on a display connected thereto.

[Standard Reproduction Mode]

The above discussion has been directed to the reproduction of high definition picture images. The reproduction of standard picture images are effected as follows.

In the automatic switching mode, the magnetic head 6 is moved to a predetermined track of the rotating magnetic disc 3 to read the DPSK signal from that track to thereby determine the picture image signals recorded thereon. If the picture image signals are those of the standard recording mode, the system control circuit 10 switches the reproduction mode to the standard reproduction mode, so that terminals "n" of the selection switches 61, 62, and 63 are connected.

In the fixed mode, if the system control circuit 10 detects that the latest recording system is the standard recording mode, terminals "n" of the selection switches 61, 62, and 63 are connected. The subsequent reproducing operations are applied to both the automatic switching mode and the fixed mode.

Thereafter, the magnetic head 6 is successively moved to predetermined tracks of the rotating magnetic disc 3 on which the picture images corresponding to one still picture image are recorded to read the picture images and the DPSK signals from the respective tracks.

The picture image signals, etc., read by the magnetic head 6 are amplified by the reproducing amplifier 30. Among them, the luminance signal (Y+S) is inputted to the reproduction processing circuit 31A through the high band pass filter (not shown) and is FM-demodulated. The color difference signals (Pr, Pb) are inputted to the C-signal reproduction processing circuit 31B through the low band pass filters (not shown) and are FM-demodulated.

The DPSK signals which have been read are inputted to the ID reproduction processing circuit 32 through the band pass filter (not shown) and are DPSK-demodulated to reproduce the ID data. The ID data are inputted to the system control circuit 10 which determines the recording system of the picture image signals read by the magnetic head 6 in accordance with the ID data to thereby perform or prohibit reproduction of the picture image signals, as will be apparent below.

Similar to the high definition reproduction mode, the system control circuit 10 controls the tracking drive circuit 7 in such a way that the output of the envelope detection signal of the reproduction signal becomes maximum, to effect the automatic tracking of the magnetic head 6. A high quality still picture image can be gained by the automatic tracking of the magnetic head 6 and/or the rotation phase control of the spindle motor 5.

The high frequency component of the luminance signal (Y+S) that has been FM-demodulated by the reproduction processing circuit 31A is cut by the low band pass filter 34A. Thereafter, the horizontal and vertical synchronizing signals (S) are separated or extracted from the luminance signal by the luminance signal separating circuit 36 and are inputted to the system control circuit 10 and the clock generating circuit 37. The horizontal and vertical synchronizing signals (S) inputted to the system control circuit 10 are used, for example, to read the ID data. The clock generating circuit 37 generates writing clock signals which are reference signals for writing data in the memories, so that the writing clock signals thus produced are inputted to the A/D converter 38A and the memory control circuit 35.

The FM-demodulated luminance signal (Y), from which the horizontal and vertical synchronizing signals (S) have been separated, is converted to a digital signal by the A/D converter 38A and is stored in the Y-memory 39A at a predetermined address. The FM-demodulated color difference signal (Pr) passes through the low band pass filter 34B to cut the high frequency component thereof, and is converted to a digital signal by the A/D converter 38B to be stored in the Pr-memory 39B through the switch 61. Similarly, the FM-demodulated color difference signal (Pb) whose high frequency component is cut by the low band pass filter 34C is converted to a digital signal by the A/D converter 38C and is stored in the Pb-memory 39C through the switch 62.

The system control circuit 10 determines whether the picture image signals read by the magnetic head 6 are the picture image signals corresponding to the first field or those corresponding to the second field, based on the ID data. The operation of the memory control circuit 35 is controlled in accordance with the determination. The memory control circuit 35 performs the following control in accordance with the writing clock signals outputted from the clock generating circuit 37 at predetermined writing times for the memories 39A through 39C.

The A/D converter 38A operates in response to the writing clock signal outputted from the clock generating circuit 37. The memory control circuit 35 actuates the writing address counter incorporated therein to write digital data of the luminance signals (Y) in the Y-memory 16A at a predetermined address.

The writing clock signals outputted from the clock generating circuit 37 are divided in half by the frequency divider 43A to actuate the A/D converters 38B and 38C. The memory control circuit 35 actuates the built-in writing address counter to write digital data of the color difference signals (Pr) and (Pb) at predetermined addresses of the Pr-memory 39B and Pb-memory 39C. Sampling of the synchronizing signals (S) included in the reproduced signals, such as the luminance signals does not occur. Accordingly, no synchronizing signal (S) is written in the memory.

The horizontal and vertical synchronizing signals corresponding to the standard picture image (for example, the horizontal and vertical signals corresponding to the NTSC system) are outputted from the synchronizing signal generating circuit 40 and are inputted to the clock generating circuit 41. The clock generating circuit 41 generates the reading clock signals which are reference signals to read the picture images from the memories. The reading clock signals are inputted to the memory control circuit 35 and the D/A converter 42A. The reading clock signals are divided in half by the frequency divider 43B and are inputted to the D/A converters 42B and 42C.

The memory control circuit 35 carries out the following control in accordance with the reading clock signals outputted by the clock generating circuit 41 at predetermined reading times for the memories 39A through 39C. The memory control circuit 35 actuates the reading address counter incorporated therein in accordance with the reading clock signals outputted from the clock generating circuit 41 to read digital data of the luminance (Y) at a predetermined address of the Y-memory 39A. At the same time, the D/A converter 42A operates to convert the digital luminance signals (Y) to analog luminance signals (Y).

The memory control circuit 35 activates the writing address counter incorporated therein in accordance with the reading clock signals outputted from the clock generating circuit 41 to read digital data of the color difference signals (Pr) and (Pb) from the Pr-memory 39B and the Pb-memory 39C at predetermined addresses. The D/A converters 42B and 42C convert the digital color difference signals to analog signals.

The mode changing between writing control and reading control in the memory control circuit 35 is controlled in accordance with the mode change command signal outputted from the system control circuit 10. The horizontal and vertical synchronizing signals (S) outputted from the synchronizing signal separating circuit 36, and the horizontal and vertical synchronizing signals (S) outputted from the synchronizing signal generating circuit 40 are also inputted to the system control circuit 10. The system control circuit 10 controls the rotational phase of the spindle motor 5 in accordance with the synchronizing signals which can also be used as timing signals for other operations.

In the case of reproduction of the standard picture images, the reading clock signal outputted from the clock generating circuit 41 and the writing clock signal outputted from the clock generating circuit 37 have the same frequency. Consequently, the frequency of the reading clock signal for the luminance signal is identical to the frequency of the writing clock signal, and the frequency of the reading clock signals for the color difference signals are identical to the frequency of the writing clock signal. The frequencies of the writing and reading clock signals for the luminance signal are twice the frequencies of the writing and reading clock signals for the color difference color signals.

The high frequency components of the analog luminance signal (Y) and color difference signals (Pr) and (Pb) are cut by the respective low band pass filters 44A, 44B, and 44C. Thereafter, the horizontal and vertical synchronizing signals (S) from the synchronizing signal generating circuit 49 are added to the luminance signal (Y) by the synchronizing signal adding circuit 45A.

The luminance signal (Y+S) and the color difference signals (Pr) and (Pb), thus obtained, are outputted as a composite video signal (NTSC signal) through the encoder 47, so that a still picture image can be reproduced on a display connected thereto.

Figure 13:
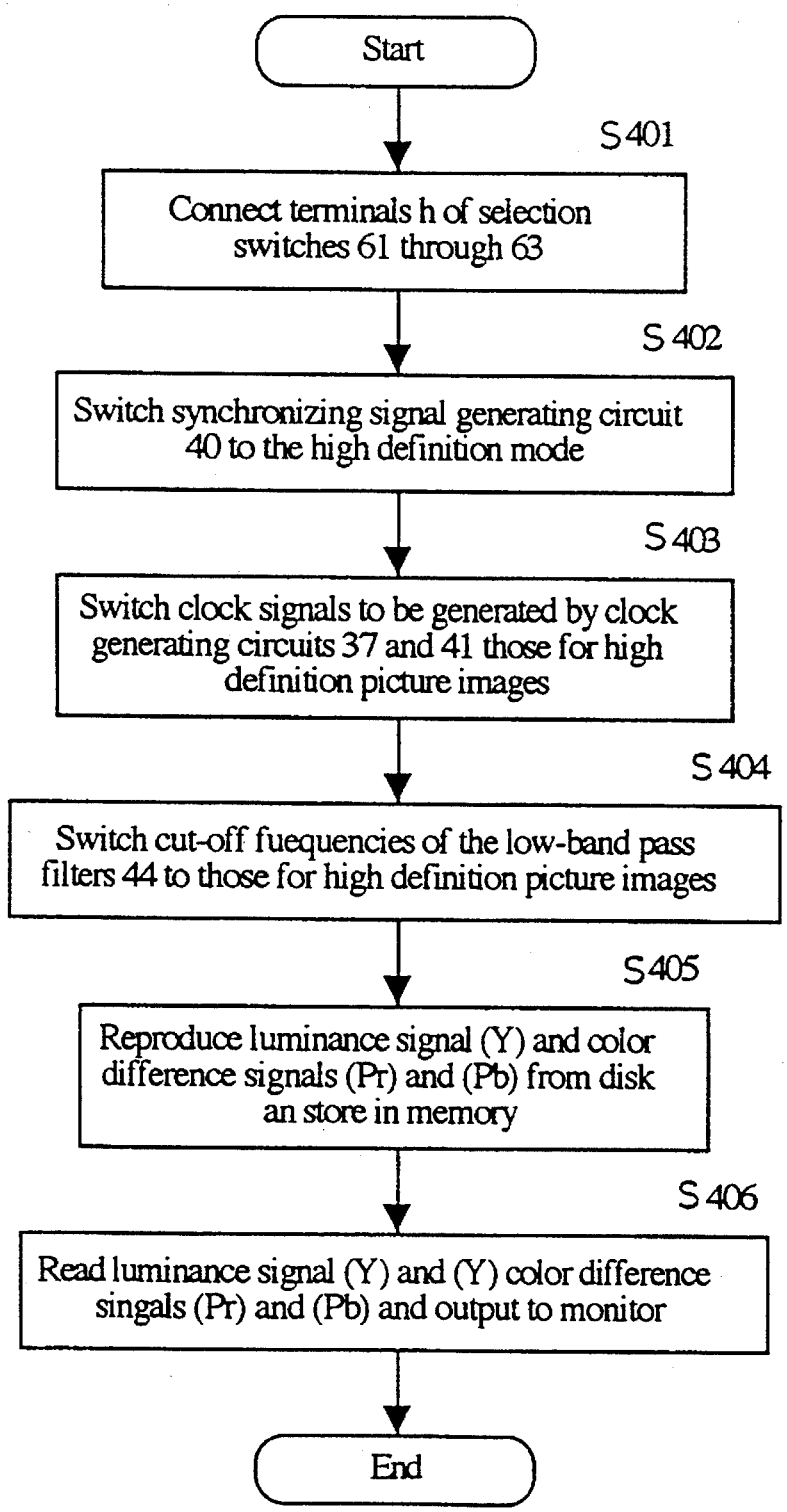
FIG. 13 is a flow chart of a reproducing operation in a high definition reproducing mode.
Figure 14:
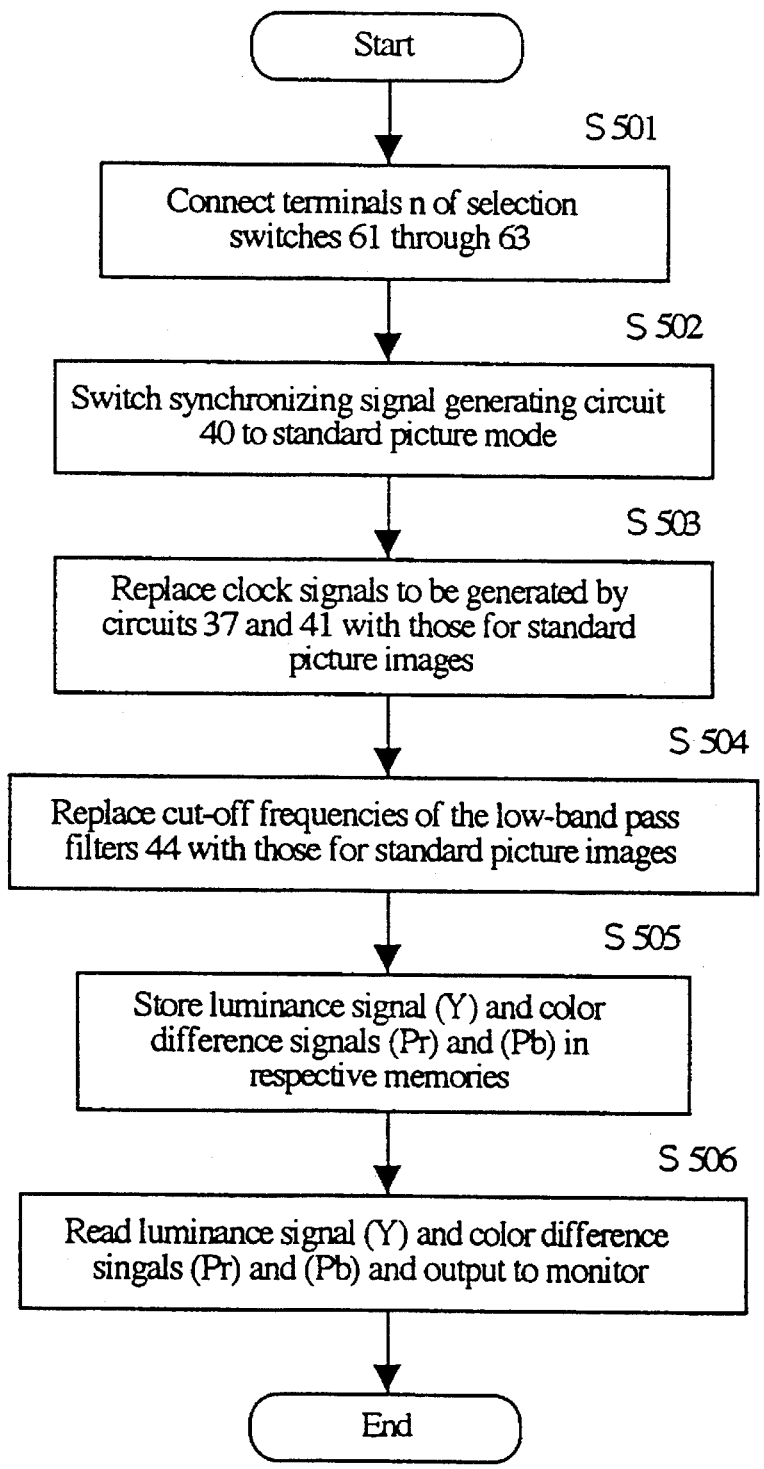
FIG. 14 is a flow chart of a reproducing operation in a standard reproducing mode.

The control operation for reproducing the picture image signals from the magnetic disc 3 when the reproduction processing system is switched by the reproduction mode switching means will be discussed below. FIG. 13 is a flow chart of a control operation to effect the reproduction at the high definition reproduction mode, and FIG. 14 is a flow chart of a control operation to effect the reproduction in the standard reproduction mode (i.e., normal reproduction mode), respectively. The switching operation of the switches, and the ON/OFF operations of the circuits are executed by the system control circuit 10.

As shown in FIG. 13, if reproduction is effected in the high definition reproduction mode (for example, if the most recent recording system is the high definition recording mode), terminals "h" of the selection switches 61 through 63 are brought into a connected position (step S401). Thereafter, the synchronizing signal generating circuit 40 is switched to the high definition mode (step S402).

Thereafter, the clock signals to be generated by the clock generating circuits 37 and 41 are switched to those for the high definition picture images (step S403). In this case, the frequency of the clock signals generated by the clock generating circuit 41 is four times the frequency of the clock signals generated by the clock generating circuit 37.

Thereafter, the cut-off frequencies of the low band pass filters 44A through 44C are switched to those for the high definition picture images (step S404). In the illustrated embodiment, the cut-off frequencies of the low band pass filters 44A through 44C are half the sampling frequencies of the D/A converters 42A through 42C.

The cut-off frequencies of the low band pass filters 34A through 34C, the sampling frequencies of the A/D converters 38A through 38C, the writing frequencies for the memories 39A through 39C, the sampling frequencies of the D/A converters 42A through 42C, and the cut-off frequencies of the low band pass filters 44A through 44C are set as shown in Table 3 below.

TABLE 3

(High definition reproduce mode)

|  | LPF | A/D, write memory | read memory, D/A | LPF |
| --- | --- | --- | --- | --- |
| Luminance signal (Y) | f/2 (34A) | f (38A, 39A) | 4f (39A, 42A) | 2f (44A) |
| Color difference signal (Pr) | f/2 (34A) | f (38B, 39B) | 2f (39B, 42B) | f (44B) |
| Color difference signal (Pb) | f/2 (34A) | f (38C, 39C) | 2f (39C, 42C) | f (44C) |

"f" is, for example, 18.6 MH$_z$:
( ) indicates numeral(s) in drawing(s).

After the respective frequencies are set as shown in Table 3 above, the luminance signal (Y) and the color difference signals (Pr) and (Pb) recorded on the corresponding tracks are reproduced and stored in the memories 39A through 39C at predetermined addresses (step S405).

Thereafter, the luminance signal (Y) and the color difference signals (Pr) and (Pb) stored in the memories 39A through 39C are simultaneously read and outputted to the monitor (step S406). Thus, the high definition picture image signals recorded in the high definition recording mode in a track pattern as shown in FIG. 4 are reproduced.

If the most recent recording system is the normal recording mode, so that the reproduction should be effected in the normal reproduction mode, as shown in FIG. 14, terminals "n" of the selection switches 61 through 63 are connected (step S501). After that, the synchronizing signal generating circuit 40 is switched to the standard picture mode (step S502).

Thereafter, the clock signals generated by the clock generating circuits 37 and 41 are replaced with those for the standard picture images (step S503). It should be noted that the frequency of the clock signals generated by the clock generating circuit 41 is identical to the frequency of the clock signals generated by the clock generating circuit 37.

Thereafter, the cut-off frequencies of the low band pass filters 44A through 44C are replaced with those for standard picture images (step S 504). In the illustrated embodiment, the cut-off frequencies of the low band pass filters 44A through 44C are half the sampling frequencies of the D/A converters 42A through 42C.

The cut-off frequencies of the low band pass filters 34A through 34C, the sampling frequencies of the A/D converters 38A through 38C, the writing frequencies for the memories 39A through 39C, the sampling frequencies of the D/A converters 42A through 42C, and the cut-off frequencies of the low band pass filters 44A through 44C are set as shown in Table 4 below.

TABLE 4

(Standard reproduce mode)

|  | LPF | A/D, write memory | read memory, D/A | LPF |
| --- | --- | --- | --- | --- |
| Luminance signal (Y) | f/2 (34A) | f (38A, 39A) | f (39A, 42A) | f/2 (44A) |
| Color difference signal (Pr) | f/4 (34B) | f/2 (38B, 39B) | f/2 (39B, 42B) | f/4 (44B) |
| Color difference signal (Pb) | f/4 (34C) | f/2 (38C, 39C) | f/2 (39C, 42C) | f/4 (44C) |

"f" is, for example, 14.3 MH$_z$
( ) indicates numeral(s) in drawing(s).

After the above mentioned frequencies are set as shown in Table 4 above, the luminance signal (Y) is subject to a predetermined reproduction process (i.e., luminance signal reproducing operation) by the reproduction processing circuit 31A. The color difference signals (Pr) and (Pb) are subject to a predetermined reproduction process (i.e., color difference signal reproducing operation) by the C-signal reproduction processing circuit 31B. Consequently, the luminance signal (Y) and the color difference signals (Pr) and (Pb) are stored in the respective memories 39A through 39C at predetermined addresses (step S505).

Thereafter, the luminance signal (Y) and the color difference signals (Pr) and (Pb), stored in the memories 39A through 39C, are simultaneously read and outputted to the monitor as a composite video signal through the encoder 47 ( step S506 ).

Thus, the standard picture image signals recorded in the normal recording mode are reproduced.

Reference below will be made to the operation for reproducing only the picture image signals recorded with the most recent recording system.

Figure 15:
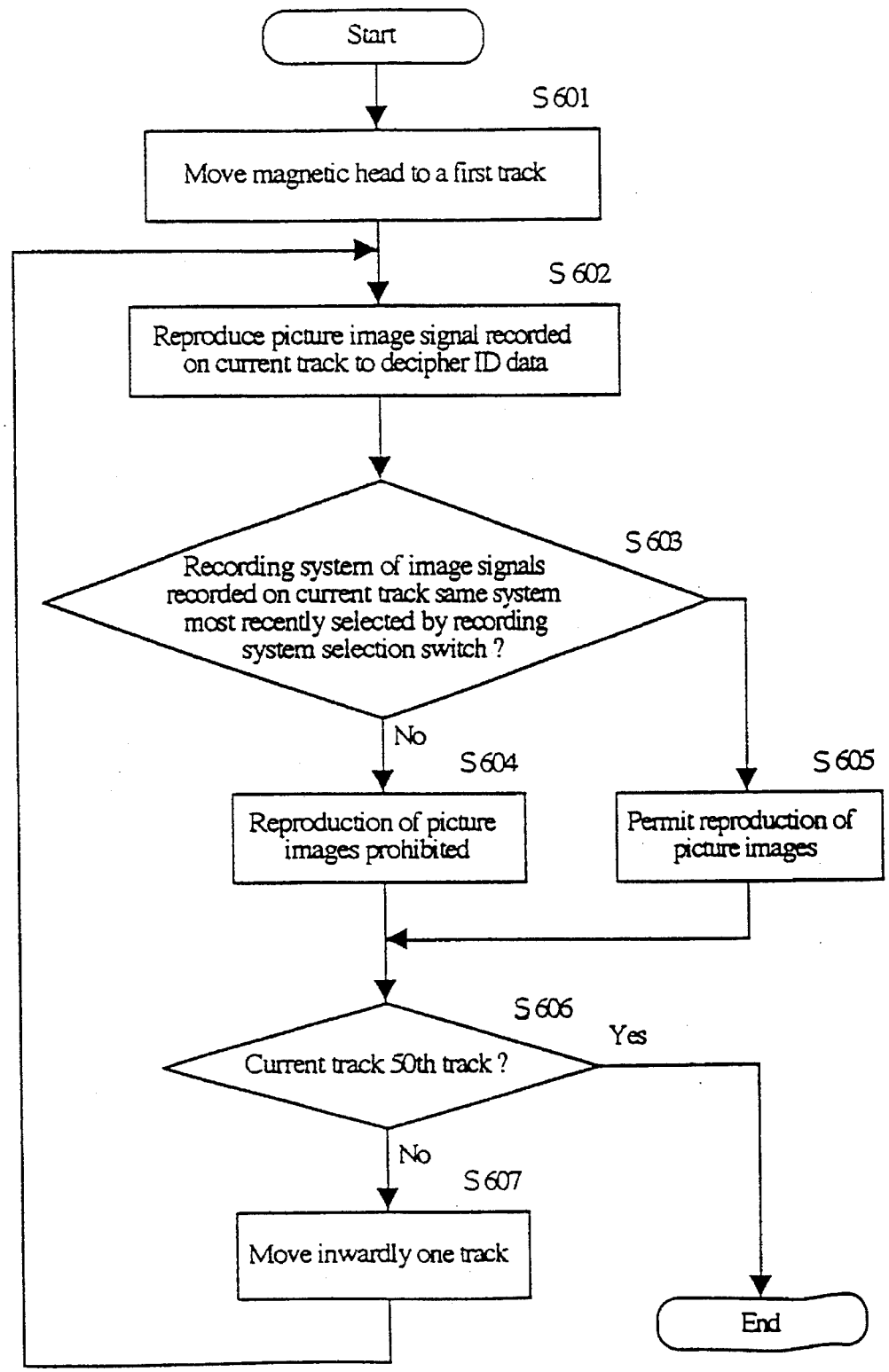
FIG. 15 is a flow chart of a reproducing operation of picture image signals; and, FIG. 16, is a flow chart of the control operation of the system control circuit 10 for carrying out automatic switching of the reproducing mode.

FIG. 15 shows a flow chart of an operation for reproducing the picture image signals from each of 50 tracks of the magnetic disc 3, by way of example.

First, the magnetic head is moved to the first track (i.e., outermost track) of the magnetic disc using a predetermined reproduction system (step S601). Thereafter, the picture image signal recorded on the current track is reproduced to decipher the ID data, so that the recording system of the picture images recorded on the current track can be detected in accordance with the ID data (step S602).

After that, whether or not the recording system of the image signals recorded on the current track is the same as the most recent recording system which has been selected by the recording system selecting switch 8a (or flag Fr) is checked (step S603).

If the recording system of the picture images recorded on the current track does not concur with the most recently selected recording system at step S603, reproduction of the picture images recorded on the current track is not permitted (step S604). Conversely, if the recording system of the picture images recorded on the current track concurs with the most recently selected system at step S603, the picture images recorded on the current track are reproduced (step S605). Namely, the reproduction is performed with a predetermined reproduction system as mentioned above, and the reproduced picture images are displayed on the monitor.

Whether the current track is the 50th track (reckoned from the outermost track, i.e., the first track) is checked in accordance with the ID data (step S606). If the current track is not the 50th track at step S606, the magnetic head is moved inward by a displacement corresponding to one track to the current track (step S607). After that, control is returned to step S602 to carry out the operations at steps S602 through S606.

Consequently, the operations at steps S602 through S606 and the operation at step S607 are repeated until the current track becomes the 50th track at step S606.

In the flow chart shown in FIG. 15, although the ID data is deciphered to effect the reproduction for each track, it is possible to reproduce the picture images after the completion of search of all the tracks.

Furthermore, although the recording unit of the still video apparatus 1 shown in FIG. 1 is provided with the recording mode switching means which is manually actuated, the present invention is not limited thereto. For instance, it is possible to provide a discriminating mechanism which discriminates the recording system of the picture images to be inputted to the recording unit, so that the recording mode switching means can be automatically actuated in association with the discriminating mechanism without the manual operation to select the record processing system corresponding to the system of the picture images signals.

FIG. 7 shows an example of an arrangement of a recording unit having such a discriminating mechanism as discussed above. The arrangement shown in FIG. 7 differs from the arrangement shown in FIG. 1 only in that the former arrangement includes the discriminating mechanism, but does not include the selection switches 56 through 58. The reproducing unit (not shown in FIG. 7) is substantially identical to the reproducing system of the still video apparatus 1 shown in FIG. 2.

There are several methods that can be used to determine whether the picture image signals inputted to the recording unit are high definition picture image signals or standard picture image signals. For instance, the following three methods (①, ② and ③) will be discussed hereinafter. In these methods, the inventors have focused on the difference between the horizontal synchronization periods of the recording systems, and the difference between the vertical synchronization periods (i.e., the period between the rise portions of two adjacent vertical synchronizing signals) of the recording systems. Specifically, the inventors have found that the recording systems of the picture image signals can be determined in accordance with these differences.

① The number of pulses of the horizontal synchronizing signals within a time set by a counter is counted. The counted number is compared with a reference number to determine the picture image signals depending on whether or not the counted number is above or below the reference number. The reference number is preferably an intermediate pulse number for the high definition picture image signals and the standard picture image signals.

For instance, for discrimination of the high vision signal (i.e., high definition image signal) and the NTSC signal, the set time is one second (1 sec), and a reference pulse number $\alpha$ is approximately 17 to 36. In this case, if the counted number is above the reference pulse number a, the picture image signals are determined to be the high vision signals. Conversely, if the counted number is below the reference pulse number $\alpha$, the picture image signals are determined to be the NTSC signals.

② The time between the two adjacent horizontal synchronizing signals or between two horizontal synchronizing signals located at opposite ends of more than two horizontal synchronizing signals is measured. The measurement is compared with a reference time to determine the kind of picture image signals. The reference time is preferably an intermediate time for the high definition picture image signals and the standard picture image signals.

For instance, if the determination of high vision signals and NTSC signals is made in accordance with the measurement of the time between two adjacent horizontal synchronizing signals, a reference time $\beta$ is preferably 30 to 63$\mu$ sec. In this case, if the measured time is shorter than the reference time $\alpha$, the picture image signals are determined to be the high vision definition signals. If the measured time is longer than the reference time $\beta$, the picture image signals are determined to be the NTSC signals. In the methods ① and ② mentioned above, the determination of the inputted picture image signals can be performed before the picture image signals for one picture plane are inputted.

③ The number of pulses of the horizontal synchronizing signals within one vertical synchronization period is counted. The counted pulse number is compared with a reference value. The reference value is preferably an intermediate pulse number for the high definition picture image signals and the standard picture images.

For instance, for the determination of the high vision signals and the NTSC signals, a reference value $\gamma$ is preferably 264 to 561. If the counted pulse number is above the reference number $\gamma$, the picture image signals are considered to be high vision signals. If the counted pulse number is below the reference number $\gamma$, the picture image signals are considered to be NTSC signals.

Although the various frequencies are set as shown in Tables 1 through 4 in the illustrated embodiments, the frequencies are not limited to these examples. The frequencies can be modified depending on the recording system of the picture image signals to be inputted to the recording unit, the frequency band of the picture image signals, or the split pattern of the picture plane (i.e., the number of the divided picture plane elements in the horizontal and vertical directions), etc.

Although the recording system and reproducing system are switched between the high definition mode and the normal mode in the illustrated embodiments, the present invention can be applied to more than two modes of the recording system and reproducing system.

As mentioned above, the reproduction of the recorded picture images is most frequently effected with the most recent recording system, but an operator might want to reproduce the recorded picture images with a recording system other than the most recent recording system. In such a case, if the picture images are recorded with a recording system different from the most recent recording system, no picture image can be reproduced. To this end, it is possible to provide a nullifying means to nullify the function or functions of the desired element or elements in the still video apparatus of the present invention.

Moreover, although the decoder 46 is provided to obtain the color difference signals from the NTSC signals as shown in FIG. 1, in the present invention, the decoder 46 can be dispensed with, provided that the decoded color difference signals or the color difference signals which are not encoded are directly inputted to the recording unit. Furthermore, it is possible to omit the selection switches 56 through 58. In addition to the foregoing, the encoder 47 shown in FIG. 2 also be dispensed with.

Although, in the illustrated embodiment, the ratio between the number of tracks on which the luminance signals (Y) are recorded, the number of tracks on which the color difference signals (Pr) are recorded, and the number of tracks on which the color difference signals (Pb) are recorded is 4:2:2, for the picture image signals corresponding to one picture plane at the high definition recording mode, the ratio is not limited thereto. The ratio could be, for example, 4:1:1 or 2:2:2, etc.

Although there is one magnetic head each for recording and reproducing the picture image signals in the illustrated embodiments, it is possible to provide a plurality of magnetic heads respectively for the recording and reproducing. In this alternative, the magnetic heads can be provided for each of the luminance signal (Y) and the color difference signals (Pr) and (Pb), or a number of magnetic heads corresponding to the picture images for one field (i.e., 8 magnetic heads located side by side in the illustrated embodiments) can be provided.

The above discussion has been directed to the frame recording, but the present invention can be applied to an apparatus in which the field recording can be effected.

Although the color difference signals (Pr) and (Pb) are recorded on the different tracks in the illustrated embodiments, it is possible to record the color difference signals (Pr) and (Pb) on the same track. In this alternative, the color difference signals (Pr) and (Pb) can be recorded in the line sequence or can be split into a plurality of signal elements (for example, two elements of former and latter halves) to be recorded within one horizontal synchronization period.

Although the recording and reproducing of the picture image signals corresponding to one picture plane begin with the outermost track of the magnetic disc 3 in the illustrated embodiments, the recording and reproducing can begin at any track.

In the illustrated embodiments, the luminance signals Y1, Y2, Y3, and Y4 of the first field; the color difference signals Pr1 and Pr2 of the first field; the color difference signals Pb1 and Pb2 of the first field; the luminance signals Y5, Y6, Y7 and Y8 of the second field; the color difference signals Pr3, Pr4 of the second field; and the color difference signals Pb3 and Pb4 of the second field are continuously recorded for each track in this order from the outermost track of the magnetic disk 3 in the high definition recording mode, but the track pattern of the magnetic disc 3 is not limited thereto.

The recording medium of the picture image signals is not limited to a magnetic recording medium such as a magnetic disc in the present invention. For instance, the recording medium can be an optical recording medium or photomagnetic recording medium, etc.

The present invention is not limited to the illustrated embodiments. In particular, the circuit arrangements of the recording unit and the reproducing unit can be of any type.

As can be understood from the above discussion, according to the present invention, different recording systems of picture image signals, for example, high vision signals such as the high definition picture image signals and the standard picture image signals such as the NTSC signals can be recorded and reproduced by a single video apparatus.

In particular, in a still video apparatus having a means for discriminating the recording system of the picture image signals, since the recording system and the reproducing system are automatically switched in accordance with the system of the picture image signals without relying upon a manual operation, not only can an operator be relieved from a troublesome operation, but also there is no possibility of failure to recognize the recording and reproducing systems. Moreover, the circuit arrangement can be simplified.

In addition, since the reproducing system corresponding to the latest recording system is automatically selected, no manual operation by an operator is necessary. Furthermore, since only the picture image signals recorded with the most recent recording system of the recording unit are reproduced, if a magnetic disc on which the picture image signals recorded at different recording systems are mixed is reproduced, reproduction with an inappropriate reproducing system is avoided.

We claim:

1. A still video apparatus having means for recording picture image signals to a recording medium during a recording operation, and means for reproducing said picture image signals recorded to said recording medium, comprising:

recording mode switching means for selecting a recording system from among a plurality of processing systems to record picture image signals to said recording medium with a recording system corresponding to a type of picture image signals inputted to said recording means;

a memory, distinct from said recording medium, that stores data identifying said selected recording system every time a recording operation is performed, each recording operation causing previously stored identifying data to be replaced by data identifying a currently selected processing system;

means for determining a most recent recording system based upon an examination of said identifying data stored in said memory; and reproducing mode switching means for reproducing only said picture image signals recorded by said recording means using a reproduction mode associated with said most recent recording system determined by said determining means.

2. The still video apparatus of claim 1, wherein said reproducing mode switching means reproduces only picture image signals that have been recorded with said recording system selected by said recording mode switching means for said most recent recording operation.

3. The still video apparatus of claim 1, wherein said recording mode switching means and said reproducing mode switching means comprises a single switch.

4. The still video apparatus of claim 1, wherein said reproduction mode reproduces all picture image signals recorded using said most recent processing system.

5. The still video apparatus of claim 1, wherein an operator of said still video apparatus manipulates said recording mode switching means to select said recording system from among said plurality of processing systems.

6. A still video apparatus, comprising:

recording mode setting means for selectively selecting one of at least a standard processing recording mode and a high definition processing recording mode;

means for recording picture image signals to a recording medium in accordance with a mode selected by said recording mode setting means;

a memory that stores data identifying which one of said at least said standard processing recording mode and said high definition processing recording mode has been selected every time a recording operation is performed, said identifying data being stored in said memory to establish a most recent processing system, each recording operation causing previously stored identifying data to be replaced by said data identifying said most recent processing system, said storing of said identifying data being performed independently of said recording operation;

means for determining said most recent processing system based upon an examination of said identifying data stored in said memory; and means for automatically reproducing only said picture signals recorded to said recording medium in accordance with said most recent processing system determined by said determining means.

7. The still video apparatus of claim 6, wherein said reproducing means reproduces only picture image signals that have been recorded with said mode selected by said recording means for said most recent processing system.

8. The still video apparatus of claim 6, wherein said recording means and said reproducing means comprise a single switch.

9. The still video apparatus of claim 6, further comprising:

means for controlling a data writing operation to write data indicating which one of said at least said standard processing recording mode and said high definition processing recording mode is selected to record picture image signals to said recording medium when said recording operation is performed.

10. The still video apparatus of claim 9, further comprising:

means for comparing said indicating data and said identifying data during a reproducing operation; and means for stopping said reproducing operation when said comparing means determines that said indicating data differs from said identifying data.

11. The still video apparatus of claim 6, wherein said memory is distinct from said recording medium.

12. The still video apparatus of claim 6, wherein said automatic reproducing means reproduces all picture signals recorded to said recording medium that were recorded with said most recent processing system.

13. The still video apparatus of claim 6, wherein an operator of said still video apparatus manipulates said recording mode setting means to select one of said at least standard processing recording mode and said high definition processing recording mode.

14. A still video apparatus having a recording system for recording picture signals to a recording medium and a reproducing system for reproducing said recorded picture signals from said recording medium, said recording system having a plurality of recording modes, said reproducing system having a plurality of reproducing modes, said still video apparatus comprising:

means for selecting a recording mode from said plurality of recording modes of said recording system in accordance with a processing system that processes picture signals to be input to said recording system;

a storage device, distinct from said recording medium, that stores data identifying said selected recording mode, said identifying data being replaced each time a recording operation is performed with new data representing a most current recording mode;

means for determining said most current recording mode by examining said identifying data stored in said storage device; and means for selecting a reproducing mode from said plurality of reproducing modes of said reproducing system based upon a determination of said determining means, so that only picture signals recorded with said most current recording mode are reproduced from said recording medium.

15. The still video apparatus of claim 14, wherein said recording mode selecting means and said reproducing mode selecting means comprise a single switch.

16. The still video apparatus of claim 14, wherein said storage device comprises a semiconductor type memory.

17. The still video apparatus of claim 14, wherein an operator of said still video apparatus manipulates said selecting means to select said recording mode.

18. A still video apparatus having a recording system for recording picture signals to a recording medium and a reproducing system for reproducing said recorded picture signals from said recording medium, said recording system having a plurality of recording modes and said reproducing system having a plurality of reproducing modes, said still video apparatus comprising:

means for selecting a recording mode from said plurality of recording modes of said recording system in accordance with a processing system that processes picture signals to be input to said recording system;

means for determining a most current selected recording mode; and means for selecting a reproducing mode from said plurality of reproducing modes of said reproducing system based upon said most current selected recording mode determined by said determining means, so that only picture signals recorded with said most current recording mode are reproduced from said recording medium.

19. The still video apparatus of claim 18, wherein said reproducing system reproduces all picture signals recorded to said recording medium that were recorded with said most current processing system.

20. The still video apparatus of claim 18, wherein said recording mode selecting means and said reproducing mode selecting means comprise a single switch.

21. The still video apparatus of claim 20, further comprising a storage device distinct from said recording medium that stores data identifying said most current recording mode, said data being examined when said reproducing mode is selected to determine said most current recording mode.

* * * * *